US012733600B2

(12) United States Patent
Cholst et al.

(10) Patent No.: US 12,733,600 B2
(45) **Date of Patent: *Sep. 15, 2026**

(54) HANDHELD BLOWER

(71) Applicant: MILWAUKEE ELECTRIC TOOL CORPORATION, Brookfield, WI (US)

(72) Inventors: Beth E. Cholst, Wauwatosa, WI (US); Bennett W. Westling, Milwaukee, WI (US); Atul Anand, Milwaukee, WI (US); Gregory A. Mutchler, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/177,277

(22) Filed: Apr. 11, 2025

(65) Prior Publication Data

US 2025/0234818 A1 Jul. 24, 2025

Related U.S. Application Data

(60) Continuation of application No. 18/401,134, filed on Dec. 29, 2023, now Pat. No. 12,426,552, which is a
(Continued)

(51) Int. Cl.

*A01G 20/47* (2018.01)
*F04D 19/00* (2006.01)
(Continued)

(52) U.S. Cl.

CPC ........... *A01G 20/47* (2018.02); *F04D 19/002* (2013.01); *F04D 25/0673* (2013.01);
(Continued)

(58) Field of Classification Search

CPC ...... F04D 19/002; F04D 29/545; F04D 25/08; F04D 25/084; A01G 20/47
See application file for complete search history.

(56) References Cited

U.S. PATENT DOCUMENTS

| | | | |
|---|---|---|---|
| 1,898,410 | A | 2/1933 | Wales |
| 2,284,586 | A | 5/1942 | McDermott |

(Continued)

FOREIGN PATENT DOCUMENTS

| | | | |
|---|---|---|---|
| CN | 2053083 | U | 2/1990 |
| CN | 2580819 | Y | 10/2003 |

(Continued)

OTHER PUBLICATIONS

Black & Decker, "Heat Gun Instruction Manual," Catalog No. HG1300, Nov. 2010 (32 pages).

(Continued)

*Primary Examiner* — Nathaniel E Wiehe
*Assistant Examiner* — Jackson N Gillenwaters
(74) *Attorney, Agent, or Firm* — Michael Best & Friedrich LLP

(57) ABSTRACT

A handheld blower including a housing, an air duct defining a duct axis, the air duct including an air inlet and an air outlet opposite the air inlet, and a handle. The handle at least partially defining a battery receiving cavity configured to receive at least a portion of a battery pack therein, where the handle defines a grip axis, and where the grip axis is parallel to the duct axis.

13 Claims, 20 Drawing Sheets

Related U.S. Application Data division of application No. 17/566,420, filed on Dec. 30, 2021, now Pat. No. 11,889,794.

(60) Provisional application No. 63/287,430, filed on Dec. 8, 2021, provisional application No. 63/131,878, filed on Dec. 30, 2020.

(51) Int. Cl.
*F04D 25/06* (2006.01)
*F04D 25/08* (2006.01)
*F04D 29/54* (2006.01)
*F04D 29/70* (2006.01)

(52) U.S. Cl.
CPC ......... *F04D 25/084* (2013.01); *F04D 29/545* (2013.01); *F04D 29/703* (2013.01)

(56) References Cited

U.S. PATENT DOCUMENTS 2,294,586 A 9/1942 Troller
2,768,782 A 10/1956 Tateishi
2,938,527 A 5/1960 Nichols
3,346,174 A 10/1967 Lievens et al.
3,407,431 A 10/1968 Melnik
3,540,547 A 11/1970 Coward, Jr.
4,185,688 A 1/1980 Wiater et al.
4,222,318 A 9/1980 Patton et al.
4,413,371 A 11/1983 Tuggle et al.
4,615,069 A 10/1986 Henning
4,692,091 A 9/1987 Ritenour
4,696,450 A 9/1987 Huang
4,734,017 A 3/1988 Levin
4,792,286 A 12/1988 Gassen
4,794,225 A 12/1988 Maese
4,821,366 A 4/1989 Levine
4,838,151 A 6/1989 Shin-Chin
4,884,314 A 12/1989 Miner et al.
4,981,414 A 1/1991 Sheets
5,035,586 A 7/1991 Sadler et al.
5,269,665 A 12/1993 Sadler et al.
5,560,076 A 10/1996 Leung
5,701,631 A 12/1997 Lindquist
5,821,473 A 10/1998 Takahashi
5,938,527 A 8/1999 Oshima et al.
5,975,862 A 11/1999 Arahara et al.
5,979,013 A 11/1999 Beckey et al.
6,105,206 A 8/2000 Tokumaru et al.
6,158,082 A 12/2000 Beckey et al.
6,244,823 B1 6/2001 Marino et al.
6,305,048 B1 10/2001 Salisian
6,324,720 B1 12/2001 Beckey et al.
6,324,721 B2 12/2001 Doragrip
6,370,729 B2 4/2002 Miyamoto
6,468,053 B2 10/2002 Wolpert
6,514,036 B2 2/2003 Marshall et al.
6,575,695 B1 6/2003 Miyamoto
6,857,163 B2 2/2005 Iida et al.
7,055,213 B2 6/2006 Iida et al.
7,300,484 B2 11/2007 Scully et al.
7,735,188 B2 6/2010 Shaffer
7,774,896 B2 8/2010 Andresen et al.
7,845,048 B1 12/2010 Bailey et al.
7,850,513 B1 12/2010 Parker et al.
7,941,894 B1 5/2011 Skorput
8,449,589 B1 5/2013 Harsy
8,510,910 B1 8/2013 Ramsey
8,745,815 B2 6/2014 Takano et al.
8,894,382 B2 11/2014 Binder
8,918,956 B2 12/2014 Pellenc
8,967,949 B2 3/2015 Gamissans Bou
9,004,854 B2 4/2015 Nakazawa
9,167,751 B2 10/2015 Thackery et al.
9,364,125 B2 6/2016 Takahashi
9,439,548 B2 9/2016 Jenson
9,538,711 B2 1/2017 Mutoh et al.
9,603,497 B2 3/2017 Yamaoka et al.
9,737,182 B2 8/2017 Gindele et al.
9,869,327 B2 1/2018 Kodato et al.
D812,825 S 3/2018 Smith et al.
9,970,445 B2 5/2018 Kodato et al.
9,974,241 B2 5/2018 Yamaoka et al.
10,000,900 B2 6/2018 Yamaoka et al.
10,065,219 B2 9/2018 Suzuki et al.
10,091,954 B1 10/2018 Yamaoka et al.
10,227,988 B2 3/2019 Gao et al.
10,232,502 B2 3/2019 Bylund et al.
10,264,739 B2 4/2019 Yamakoa et al.
10,306,843 B2 6/2019 Thackery et al.
D853,061 S 7/2019 Dretzka et al.
D854,265 S 7/2019 Wachter et al.
10,337,526 B2 7/2019 Shao et al.
10,398,095 B2 * 9/2019 Gao .......................... E01H 1/08
10,405,707 B2 9/2019 Zhu et al.
10,487,850 B2 11/2019 Shao et al.
10,670,048 B2 6/2020 Landen et al.
10,774,487 B2 9/2020 Yamaoka et al.
11,333,172 B1 5/2022 Tzeng
D970,832 S 11/2022 Shao
D1,008,581 S 12/2023 Xu et al.
D1,035,191 S 7/2024 Chen
D1,046,337 S 10/2024 Chen
2002/0060107 A1 5/2002 Kamoshita et al.
2003/0033689 A1 2/2003 Marshall et al.
2004/0159109 A1 8/2004 Harvie
2007/0294855 A1 12/2007 Iida et al.
2008/0098703 A1 5/2008 Lucas et al.
2009/0038108 A1 2/2009 Shaanan et al.
2009/0180902 A1 7/2009 Tung et al.
2009/0241285 A1 10/2009 Hinklin et al.
2010/0003149 A1 1/2010 Nelson
2010/0192314 A1 8/2010 Otsuka et al.
2010/0247316 A1 9/2010 Aynsley et al.
2011/0146023 A1 6/2011 Wada et al.
2012/0093490 A1 4/2012 Steinberg
2012/0096672 A1 4/2012 Hatano et al.
2012/0138058 A1 6/2012 Fu et al.
2013/0183141 A1 7/2013 Tan
2014/0056738 A1 2/2014 Takahashi
2014/0086728 A1 3/2014 Engert et al.
2014/0140861 A1 5/2014 Pellenc
2015/0282356 A1 10/2015 Takahashi et al.
2015/0377253 A1 12/2015 Shibata et al.
2016/0157686 A1 6/2016 Bermudez et al.
2016/0169249 A1 6/2016 Takahashi et al.
2016/0195097 A1 7/2016 Patrick
2016/0216249 A1 7/2016 Sass
2016/0265540 A1 9/2016 Tirone et al.
2016/0298635 A1 10/2016 Su et al.
2016/0305438 A1 10/2016 Yamamoto et al.
2016/0324380 A1 11/2016 Sergyeyenko et al.
2017/0045246 A1 2/2017 Kaleta et al.
2017/0208748 A1 7/2017 Yamaoka et al.
2018/0000014 A1 1/2018 Yamaoka et al.
2018/0094393 A1 4/2018 Takahashi et al.
2018/0146628 A1 5/2018 Huo et al.
2018/0146682 A1 5/2018 Beau et al.
2018/0209429 A1 7/2018 Ishida
2019/0021243 A1 1/2019 Naka et al.
2019/0098844 A1 4/2019 Yang et al.
2019/0191638 A1 6/2019 Yamaoka et al.
2019/0353171 A1 11/2019 Hoffman
2020/0096006 A1 3/2020 Shao et al.
2020/0137966 A1 5/2020 Suzuki et al.
2020/0352132 A1 11/2020 Johnson et al.
2021/0033115 A1 2/2021 Hoffman et al.
2022/0183241 A1 6/2022 Liu et al.
2022/0201946 A1 6/2022 Cholst et al.
2022/0213903 A1 7/2022 Sakuragi et al.
2022/0412364 A1 12/2022 Takano et al.

(56) References Cited

U.S. PATENT DOCUMENTS

FOREIGN PATENT DOCUMENTS

| | | | |
|---|---|---|---|
| CN | 101135139 | B | 1/2011 |
| CN | 201968600 | U | 9/2011 |
| CN | 202015678 | U | 10/2011 |
| CN | 202157288 | U | 3/2012 |
| CN | 203270492 | U | 11/2013 |
| CN | 103671175 | A | 3/2014 |
| CN | 203498784 | U | 3/2014 |
| CN | 104074155 | A | 10/2014 |
| CN | 204126922 | U | 1/2015 |
| CN | 104564839 | A | 4/2015 |
| CN | 102296555 | B | 5/2015 |
| CN | 204722966 | U | 10/2015 |
| CN | 105248156 | A | 1/2016 |
| CN | 205999837 | U | 3/2017 |
| CN | 206090426 | U | 4/2017 |
| CN | 206289575 | U | 6/2017 |
| CN | 107269550 | A | 10/2017 |
| CN | 206815252 | U | 12/2017 |
| CN | 106284153 | B | 1/2018 |
| CN | 106284148 | B | 5/2018 |
| CN | 106284149 | B | 5/2018 |
| CN | 207498881 | U | 6/2018 |
| CN | 207582389 | U | 7/2018 |
| CN | 107201734 | B | 8/2018 |
| CN | 108476871 | A | 9/2018 |
| DE | 29921751 | U1 | 2/2000 |
| DE | 19523339 | C2 | 5/2001 |
| DE | 102007037011 | A1 | 2/2008 |
| DE | 102010054841 | A1 | 6/2012 |
| DE | 202017106572 | U1 | 1/2018 |
| EP | 3133973 | B1 | 2/2018 |
| FR | 2224713 | A1 | 10/1974 |
| FR | 2840172 | A1 | 12/2003 |
| GB | 2156962 | A | 10/1985 |
| GB | 2390118 | A | 12/2003 |
| GB | 6303830 | | 8/2023 |
| JP | H0214790 | A | 1/1990 |
| JP | 2749885 | B2 | 5/1998 |
| JP | 2000018720 | A | 1/2000 |
| JP | 2009264300 | A | 11/2009 |
| JP | 2014037818 | A | 2/2014 |
| JP | 2014148950 | A | 8/2014 |
| JP | 2020193580 | A | 12/2020 |
| WO | WO8904135 | A1 | 5/1989 |
| WO | WO2012136906 | A2 | 10/2012 |
| WO | WO2012140825 | A1 | 10/2012 |
| WO | WO2016044268 | A1 | 3/2016 |
| WO | WO2018028639 | A1 | 2/2018 |
| WO | WO2018164145 | A1 | 9/2018 |
| WO | WO2019062279 | A1 | 4/2019 |
| WO | WO2019206581 | A1 | 10/2019 |

OTHER PUBLICATIONS

Black & Decker, "20V Max* Lithium Sweeper" Instruction Manual, Model No. LSW20, Nov. 2011 (32 pages).
Black & Decker, "36V Lithium Hard Surface Sweeper Vac Instruction Manual," Model No. LSWV36, Jun. 2012 (44 pages).
Black & Decker, "Cordless Broom Instruction Manual," Catalog Nos. NS118, NS118L, Jun. 2011 (6 pages).
Black & Decker, "Instruction Manual," Catalog No. BV2500, BV9000, May 2004 (4 pages).
Black & Decker, "Straight Tube Blower / Sweeper," Instruction Manual, Catalog No. BL950, Aug. 2003 (3 pages).
Black & Decker, "Sweeper," Instruction Manual, Catalog No. CS100, © 2003 (4 pages).
DeWalt, "D26950, D26960 Heavy-Duty Heat Gun," Instruction Manual, Aug. 2009 (7 pages).
E Magazine, "Blow, Leaves, Blow," Sep./Oct. 2012, p. 36.
Greenworks, "24V Lithium-Ion Cordless Blower 24352," Owner's Manual, Apr. 24, 2014 (18 pages).
Greenworks, "40V Brushless Blower/Vac 24322," Owner's Manual, Jul. 25, 2013 (13 pages).
Greenworks, "40V Lithium-ion Cordless Blower 24212," Owner's Manual, Dec. 24, 2012 (20 pages).
Greenworks, "40V Lithium-Ion Cordless Blower 24252," Owner's Manual, Jan. 15, 2013 (20 pages).
Kobalt Tools, "Kobalt 40-Volt Max* Blower," <https://web.archive.org/web/20150509211919/http://kobalttools.com:80/ . . . > web page publicly available at least as early as May 2015.
Leister, "Hot Air Blower Hotwind Premium Hotwind System," Brochure, May 2011 (4 pages).
Machine Design, "Leaf Removal is a Breeze," Feb. 24, 2000, pp. 60, 62.
Outdoor Power Equipment, "DR Power introduces lithium-ion battery-powered hand tools," Jul. 2012, p. 60.
Popular Mechanics, "Leaf Mover and Shaker," Oct. 2009, p. 28.
Pro Tool Reviews, "Kobalt 40V Max Lithium-Ion Mower, Blower, and Chainsaw," <https://web.archive.org/web/20140630170346/http://www.protoolreviews.com/tools/outdoor-eq . . . > web page publicly available at least as early as Jun. 2014.
Remington, "18 Volt Cordless Blower RM170B," Operator's Manual, Apr. 2011 (12 pages).
Ryobi, "18 Volt Blower, P2100, P2100A, P2100B," Operator's Manual, Rev. 04, Feb. 25, 2008 (14 pages).
Shop Vac, "Wet/Dry Vacuum," User Manual, © 2013 (15 pages).
Steinel, "Electronic Heat Guns," <https://web.archive.org/web/20121022121431/http://www.steinel.net/pro . . . > webpage available at least as early as Oct. 2012 (3 pages).
Steinel, "Heat Gun," Handbook, © 2007 (28 pages).
Stihl, "Saving Green and Going Green by Choosing Orange," Feb. 2012 (2 pages).
Stihl, "Stihl BGA 85," Nov. 2010 Manual, © 2010(30 pages).
Stihl, "Stihl BGA 85," Instruction Manual, © 2013 (60 pages).
Stihl, "Stihl BGA 85," Instruction Manual, © 2011 (56 pages).
Toolmonger, "This Shop-Vac Blows (But in a Good Way)," <https://toolmonger.com/2007/05/10/this-shop-vac-blows-but-in-a-good-way/> webpage available as early as May 10, 2007 (3 pages).
Toro, "Rake and Vac, Super, and Ultra Blower/Vacuum," Operator's Manual, © 2012 (6 pages).
Troy-Bilt "TB4300 / TB4300B Cordless Blower," Operator's Manual, Mar. 2016 (32 pages).
Worx, "18V Cordless Li-ion Blower/Sweeper, WG540," Manual © 2009 (10 pages).
Worx, "Cordless Li-ion Blower/Sweeper, WG545," Manual © 2015 (28 pages).
Charles & Hudson, "Stihl BGA 85 Electric Leaf Blower," <https://www.youtube.com/watch?v=JMK4zdlUbbY> YouTube video publicly available at least as early as Feb. 25, 2012.
International Search Report and Written Opinion for Application No. PCT/US2021/065752 dated Apr. 19, 2022 (10 pages).

* cited by examiner

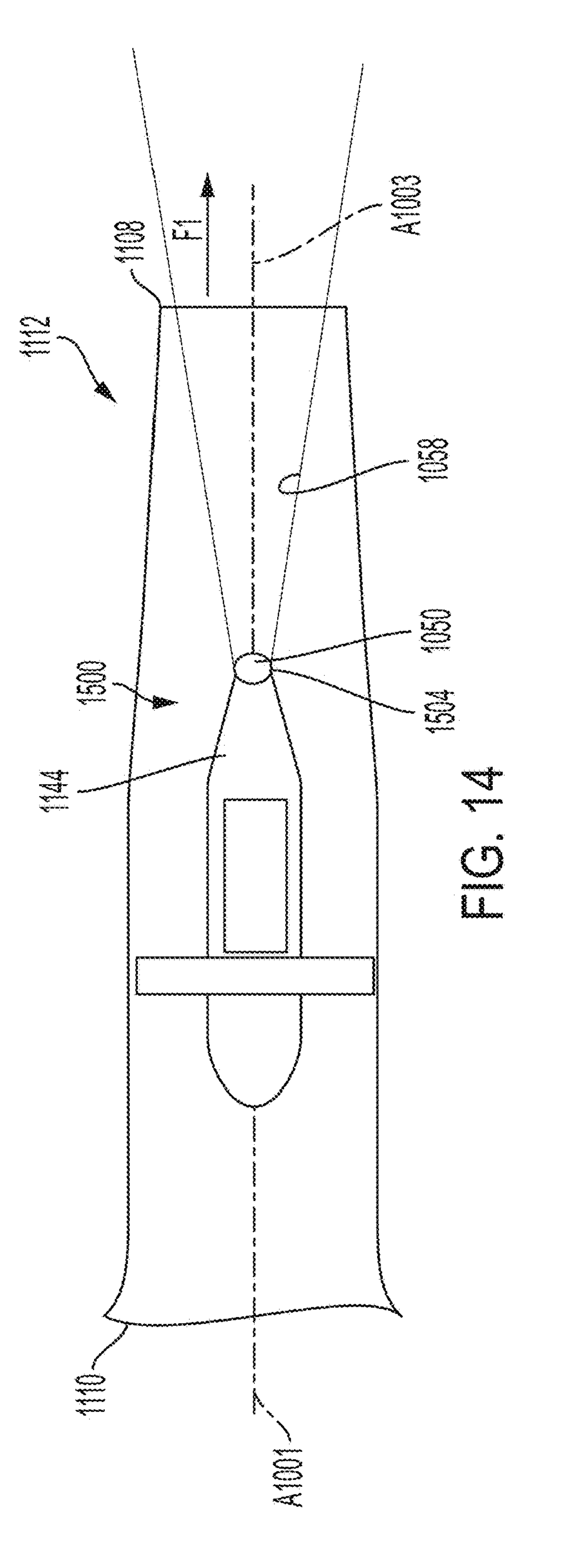
FIG. 14
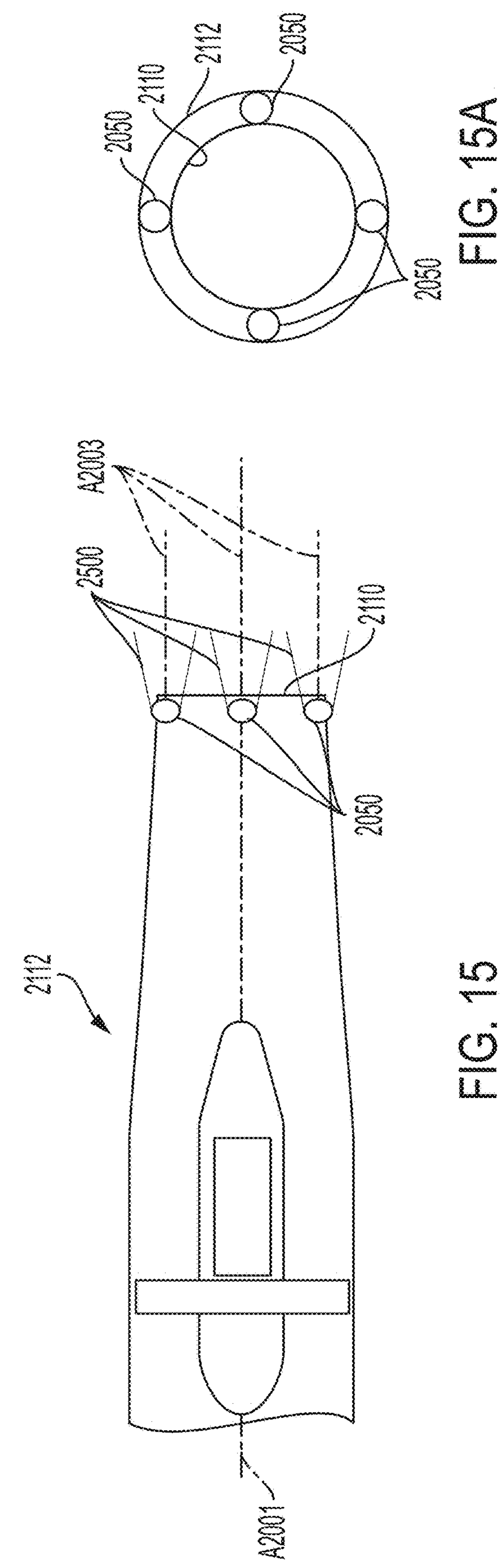
FIG. 15A
FIG. 15

HANDHELD BLOWER

CROSS-REFERENCE TO RELATED APPLICATION

The present application is a continuation application of U.S. patent application Ser. No. 18/401,134, filed Dec. 29, 2023, which is a divisional application of U.S. patent application Ser. No. 17/566,420, filed Dec. 30, 2021, now issued U.S. Pat. No. 11,889,794, which in turn is a formalization of U.S. Provisional Patent Application No. 63/131,878, filed Dec. 30, 2020 and U.S. Provisional Patent Application No. 63/287,430, filed Dec. 8, 2021. The entire contents of all of which are hereby incorporated by reference.

FIELD

The present invention relates to handheld blowers, and more particularly to battery powered handheld blowers.

BACKGROUND

Handheld blowers are generally used to produce and output a stream of air to be directed by the user.

SUMMARY

In one embodiment, a handheld blower including a housing, an air duct defining a duct axis, the air duct including an air inlet and an air outlet opposite the air inlet, and a handle. The handle at least partially defining a battery receiving cavity configured to receive at least a portion of a battery pack therein, where the handle defines a grip axis, and where the grip axis is parallel to the duct axis.

In another embodiment, A handheld blower including a housing, an air duct defining a duct axis, the air duct including an air inlet and an air outlet opposite the air inlet, a fan disposed in the air duct between the air inlet and the air outlet, the fan configured to rotate about the duct axis, the fan including a fan hub and a plurality of fan blades extending radially outwardly from the fan hub to include a fan tip, the fan defining a first radius extending between the duct axis and the radial exterior of the fan hub, the fan also defining a second radius extending between the duct axis and the blade tip of a fan blade, and where a ratio of a first radius and the second radius is between 0.6 and 0.8.

In another embodiment, a handheld blower including a housing, an air duct including an air inlet and an air outlet opposite the air inlet, where the air duct defines a duct axis, a fan disposed in the air duct between the air inlet and the air outlet, the fan configured to rotate about the duct axis, the fan including fan hub and a plurality of fan blades extending radially outwardly from the fan hub, each fan blade including an upstream connection point to the fan hub, and where the air duct includes an air duct intake length extending axially between the air inlet and the upstream connection point, where the air duct includes an air duct radius between an inner surface of the air duct and the duct axis at a position between the air inlet and the upstream connection point, and where a ratio of the air duct radius to the air duct intake length is between 0.4 and 0.5.

In another embodiment, a handheld blower including a housing, an air duct including an air inlet and an air outlet opposite the air inlet, the air duct defining a duct axis, a fan disposed in the air duct between the air inlet and the air outlet, the fan configured to rotate about the duct axis, a cover disposed in the air duct between the fan and the air outlet, the cover having a first length extending along the axis, and a flow region disposed radially between the cover and an inner surface of the air duct, the flow region including an annular cross-sectional area that is constant along a majority of the first length.

In another embodiment, a handheld blower including a housing, an air duct including an air inlet and an air outlet opposite the air inlet, where the air duct defines a duct axis, a fan disposed in the air duct between the air inlet and the air outlet, the fan configured to rotate about the duct axis, the fan including fan hub and a plurality of fan blades extending radially outwardly from the fan hub, each fan blade including an upstream connection point to the fan hub, and where the air duct includes an air duct intake length extending axially between the air inlet and the upstream connection point, and where the air duct further includes a bell shape section extending along at least a portion of the air duct intake length, and where the bell shape defines a maximum duct radius and a minimum duct radius, and where the ratio of the minimum duct radius and the air duct intake length is between 0.4 and 0.55.

In another embodiment, a handheld blower including a housing, an air duct including an air inlet and an air outlet opposite the air inlet, where the air duct defines a duct axis, a fan disposed in the air duct between the air inlet and the air outlet, the fan configured to rotate about the duct axis, the fan including fan hub and a plurality of fan blades extending radially outwardly from the fan hub, each fan blade including an upstream connection point to the fan hub, and where the air duct includes an air duct intake length extending axially between the air inlet and the upstream connection point, where the air duct further includes a bell shape section extending along at least a portion of the air duct intake length, where the air duct further includes a cylindrical section extending along at least a portion of the air duct intake length, where at least a portion of the cylindrical section is disposed between the bell shape section and the fan, and where the bell shape section includes a maximum bell radius, the cylindrical section includes a cylinder radius, and wherein a ratio of the cylinder radius and the maximum bell radius is between 0.6 and 0.73.

BRIEF DESCRIPTION OF THE DRAWINGS

FIG. 14 is a cross-sectional elevation view of another embodiment of an air duct with a light source included therein.

FIG. 15 is a cross-sectional elevation view of another embodiment of an air duct with light sources mounted thereon.

FIG. 15A is an end view of the air duct of FIG. 15.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
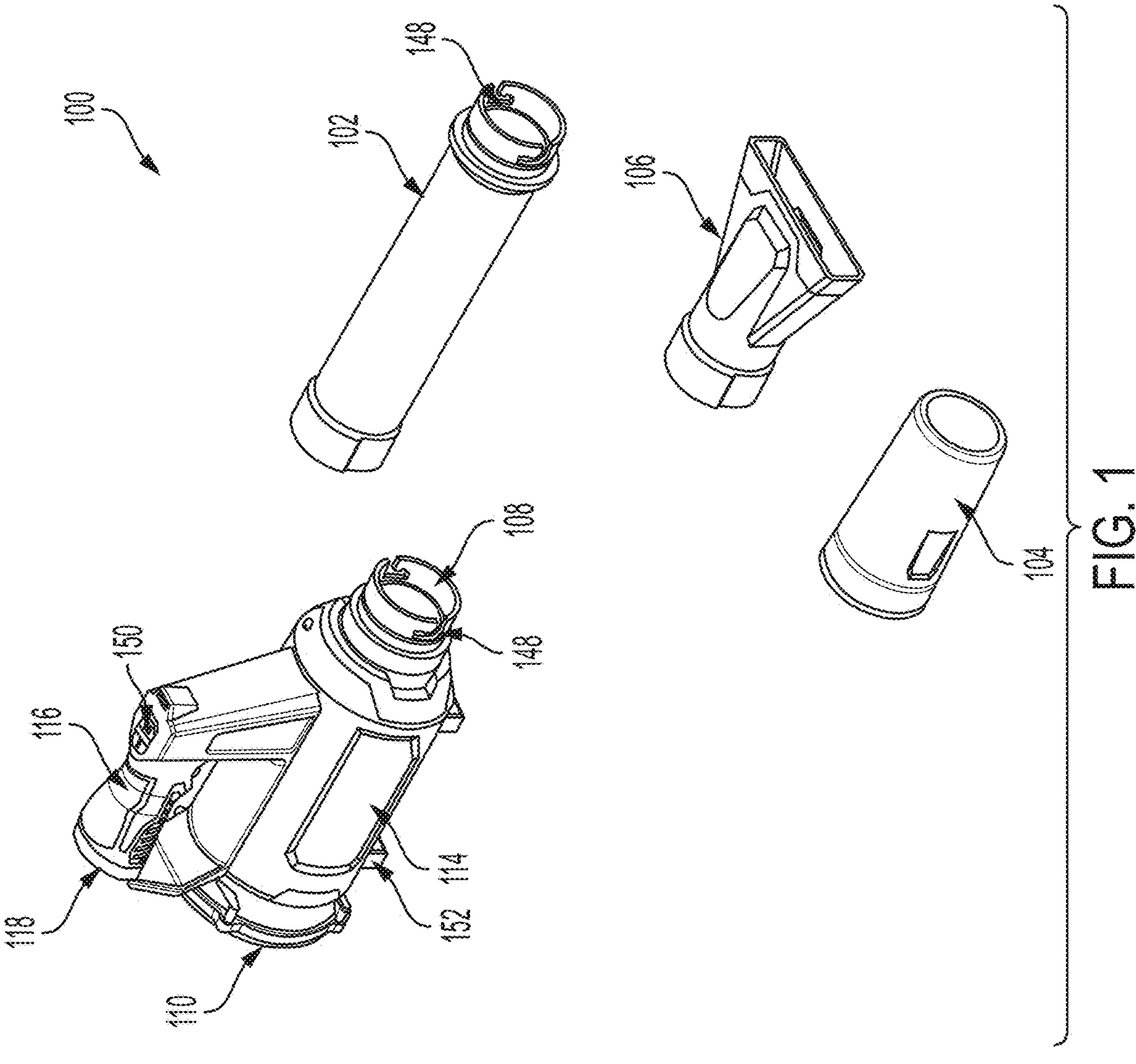
FIG. 1 is a perspective view of a handheld blower with optional attachments, according to embodiments disclosed herein.
Figure 11:
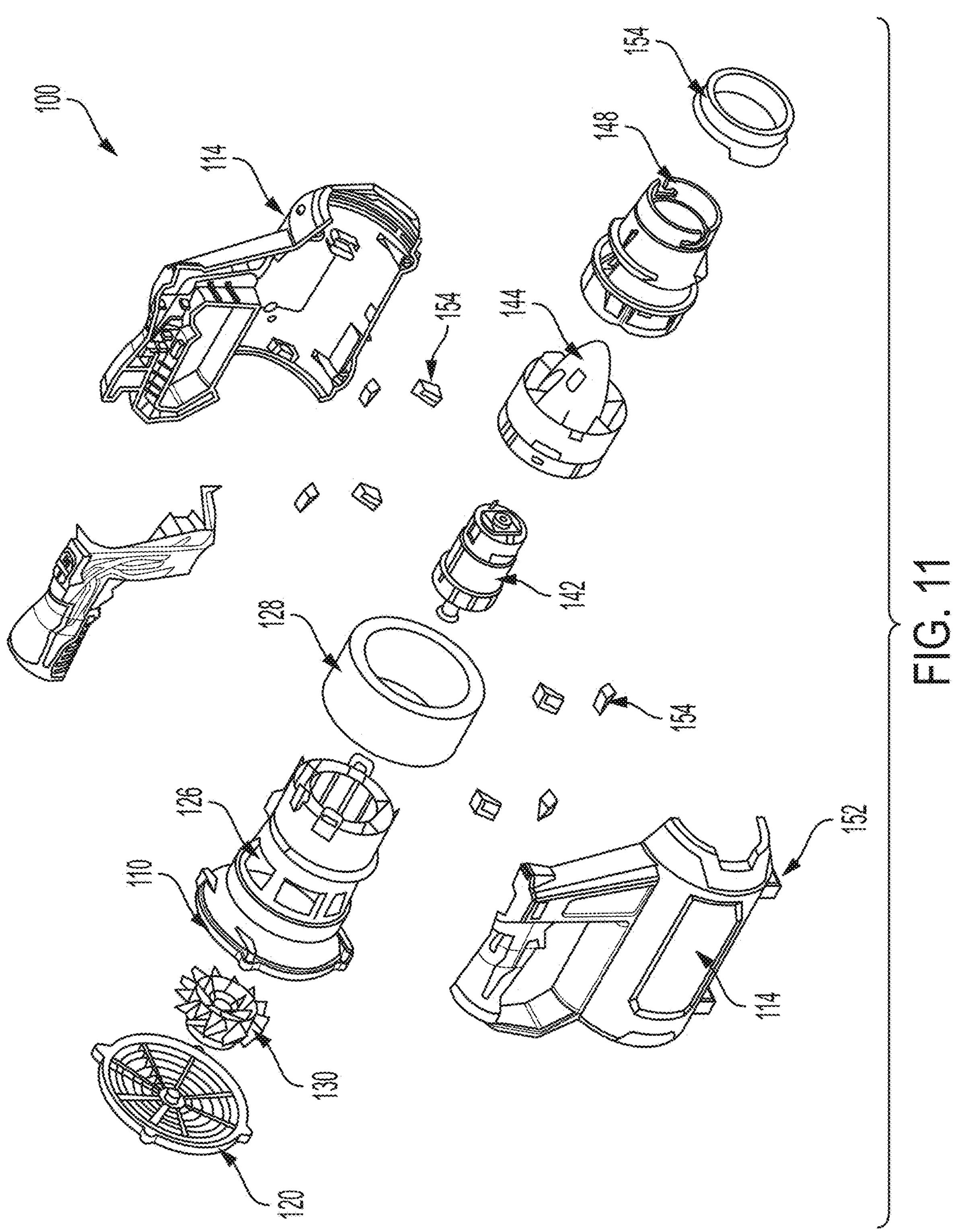
FIG. 11 is an exploded perspective view of the handheld blower of FIG. 1.

FIG. 1 generally illustrates an electrically powered handheld blower 100. The handheld blower 100 includes a housing 114, an air duct 112 defining an axis A1 therethrough, and a fan assembly 115 at least partially positioned within the air duct 112. The air duct 112, in turn, includes an inlet 110 into which air is drawn during operation and an outlet 108 opposite from and downstream of the inlet 110 through which air is exhausted. In the illustrated embodiment, the air duct 112 is at least partially surrounded by the housing 114 of the blower 100. As shown in FIG. 11, in some embodiments the housing 114 may include two clamshell halves that are joined together with fasteners to surround the air duct 112. While the illustrated embodiment depicts a separate air duct 112 surrounded between two clamshell halves of the housing 114, it is understood that in alternative embodiments the air duct 112 may be attached to the outside of the housing 114. Still further, in other embodiments the air duct 112 and the housing 114 may be formed together as a single unit.

Figure 2:
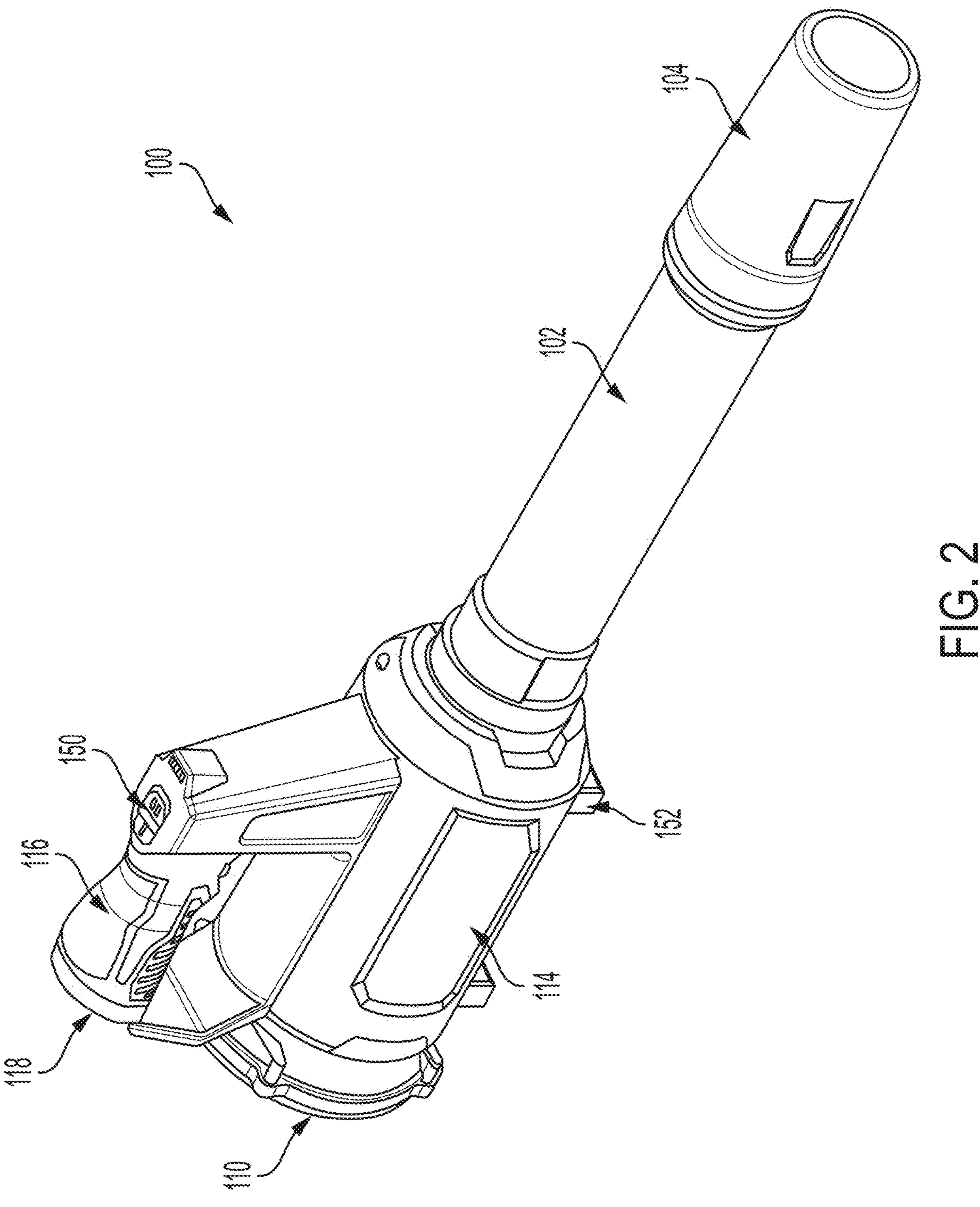
FIG. 2 is a perspective view of the handheld blower of FIG. 1 with an extension attachment and frustoconical nozzle attachment.
Figure 3:
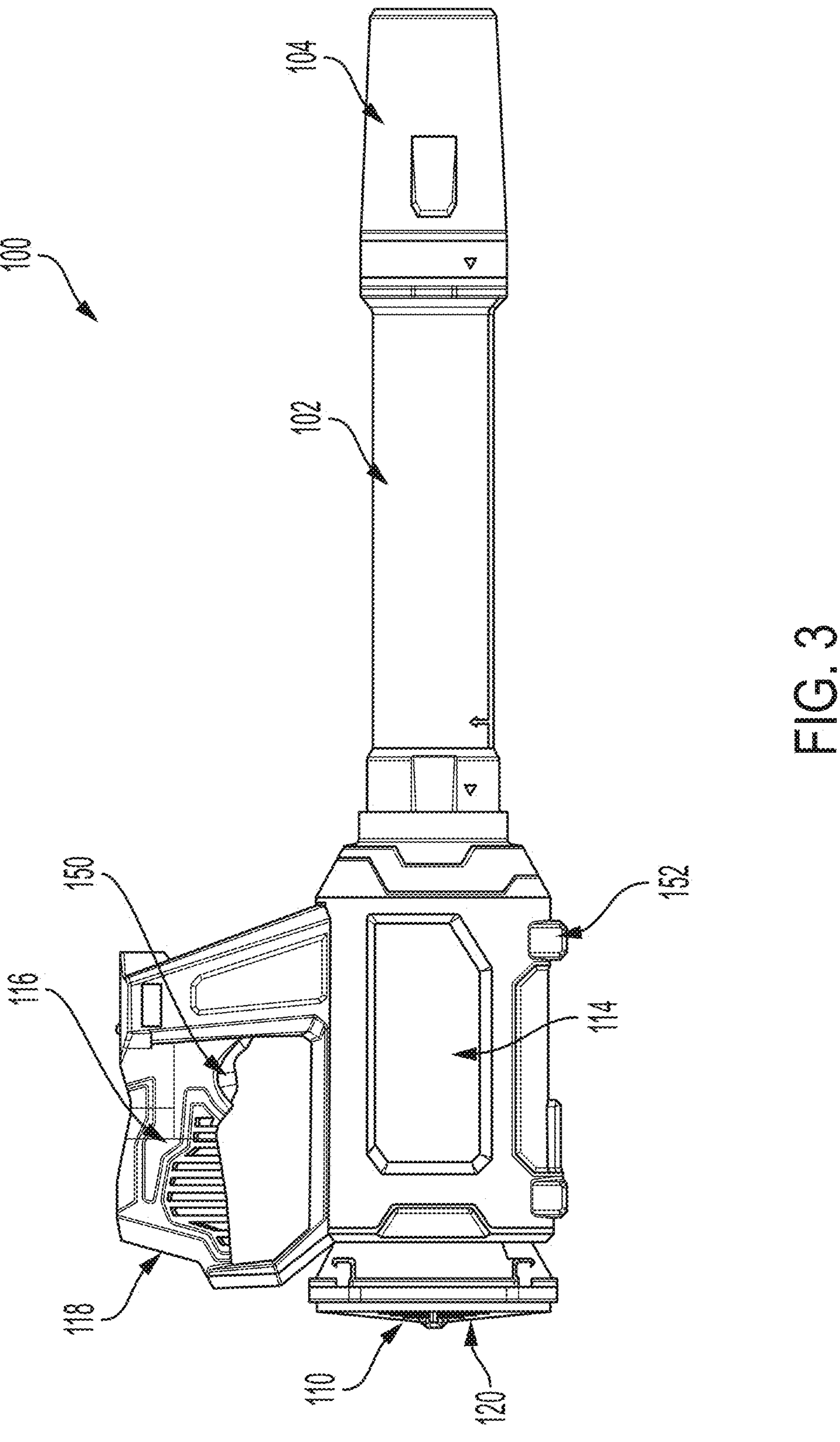
FIG. 3 is a side elevation view of the handheld blower of FIG. 1 with the extension attachment and frustoconical nozzle attachment.
Figure 4:
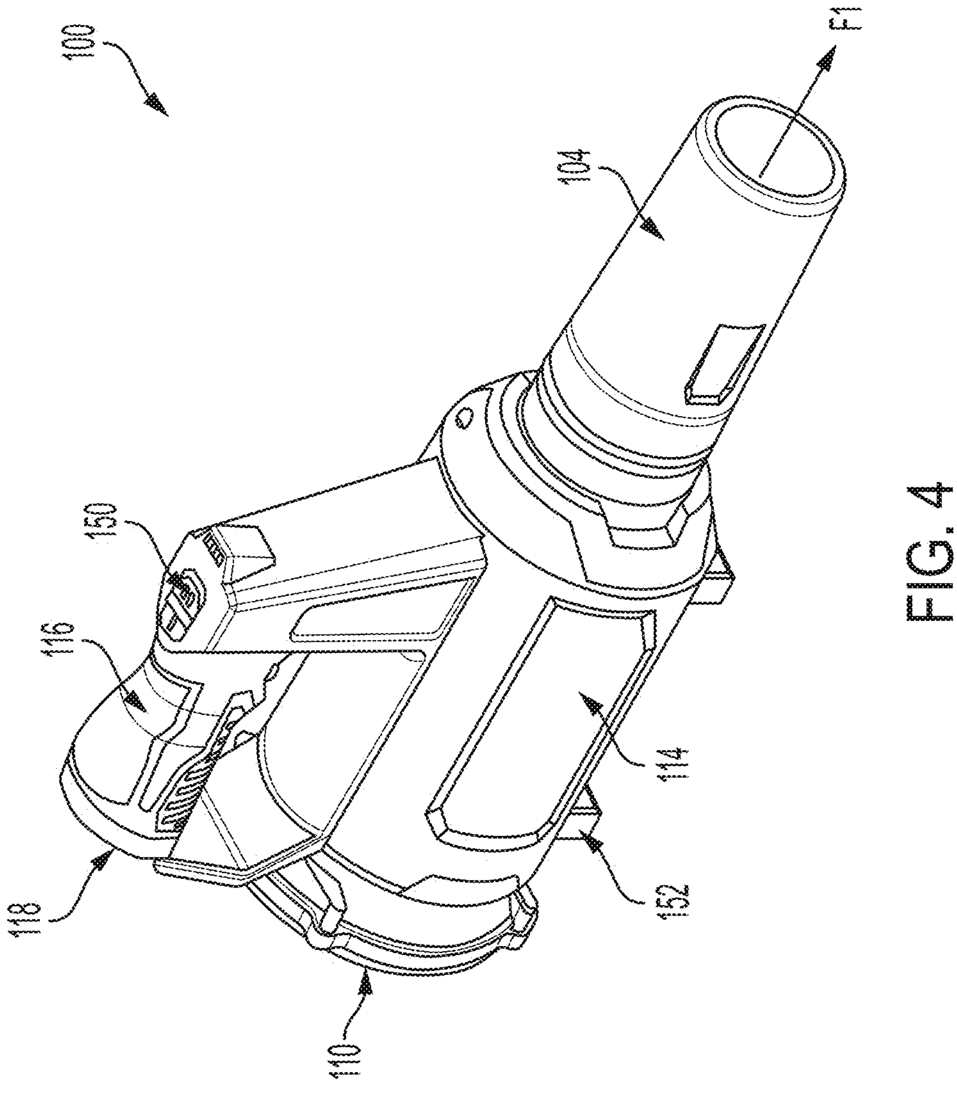
FIG. 4 is a perspective view of the handheld blower of FIG. 1 with the frustoconical nozzle attachment.
Figure 6:
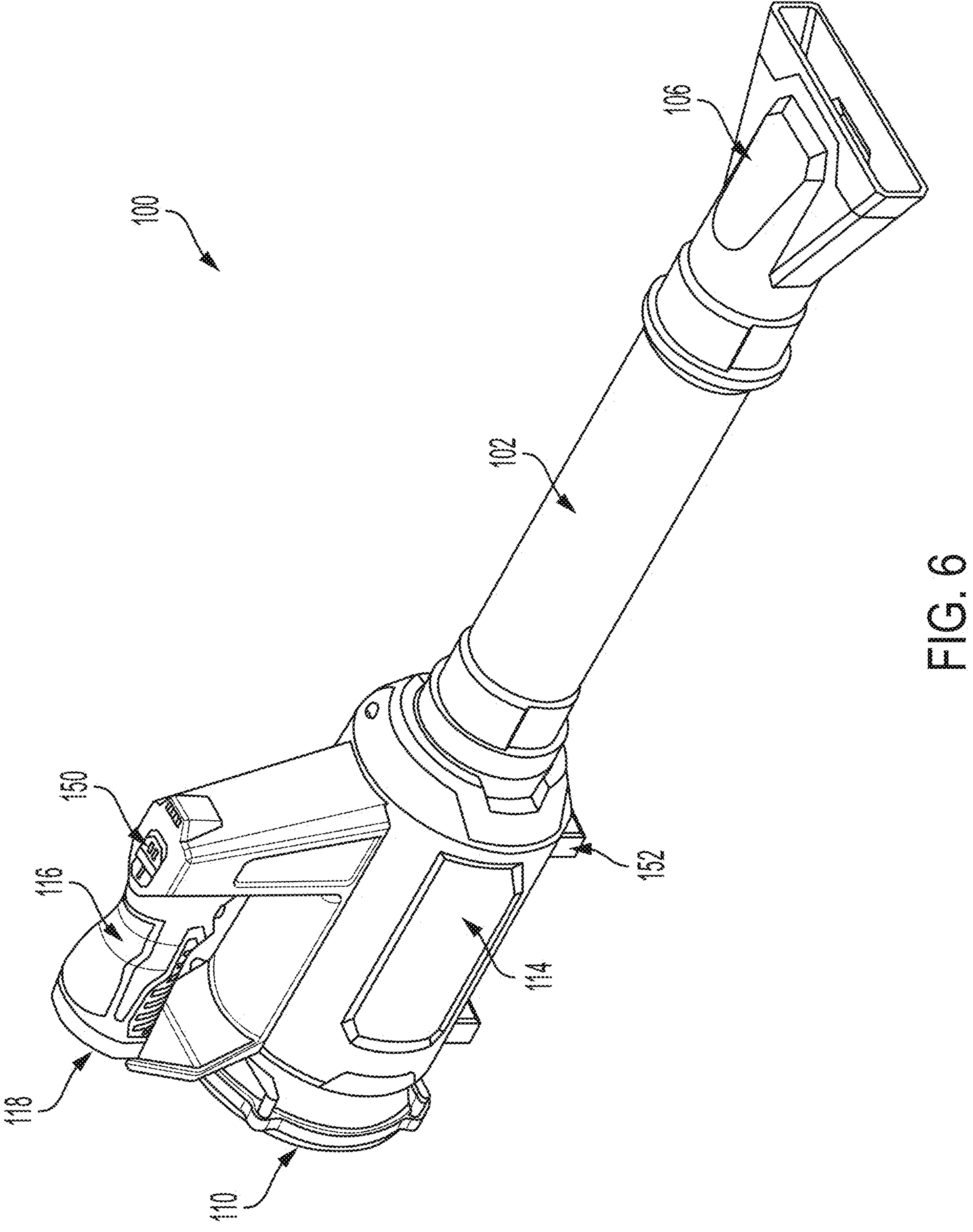
FIG. 6 is a perspective view of the handheld blower of FIG. 1 with the extension attachment and a rectangular outlet nozzle attachment.
Figure 7:
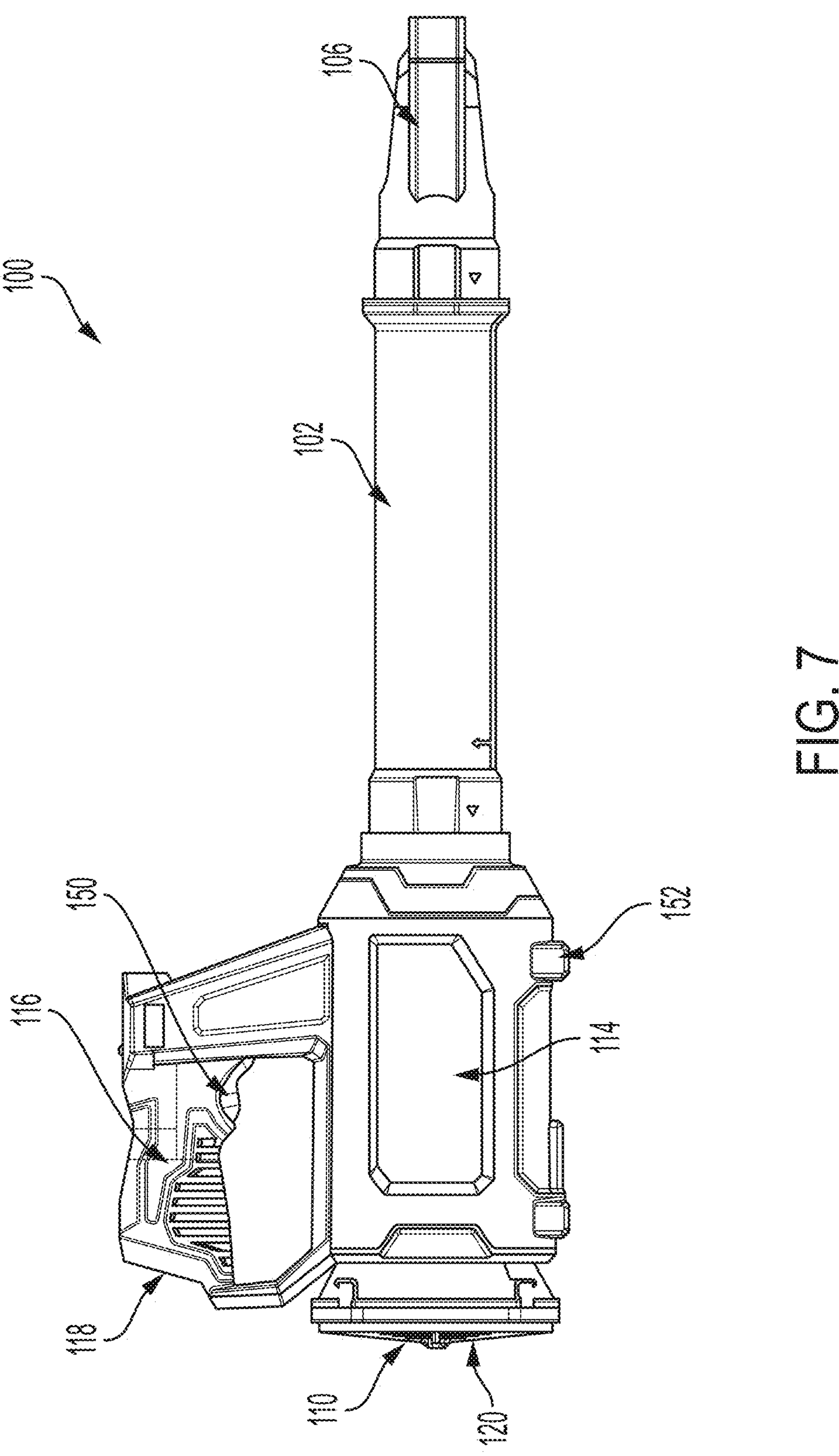
FIG. 7 is a side elevation view of the handheld blower of FIG. 1 with the extension attachment and rectangular outlet nozzle attachment.
Figure 8:
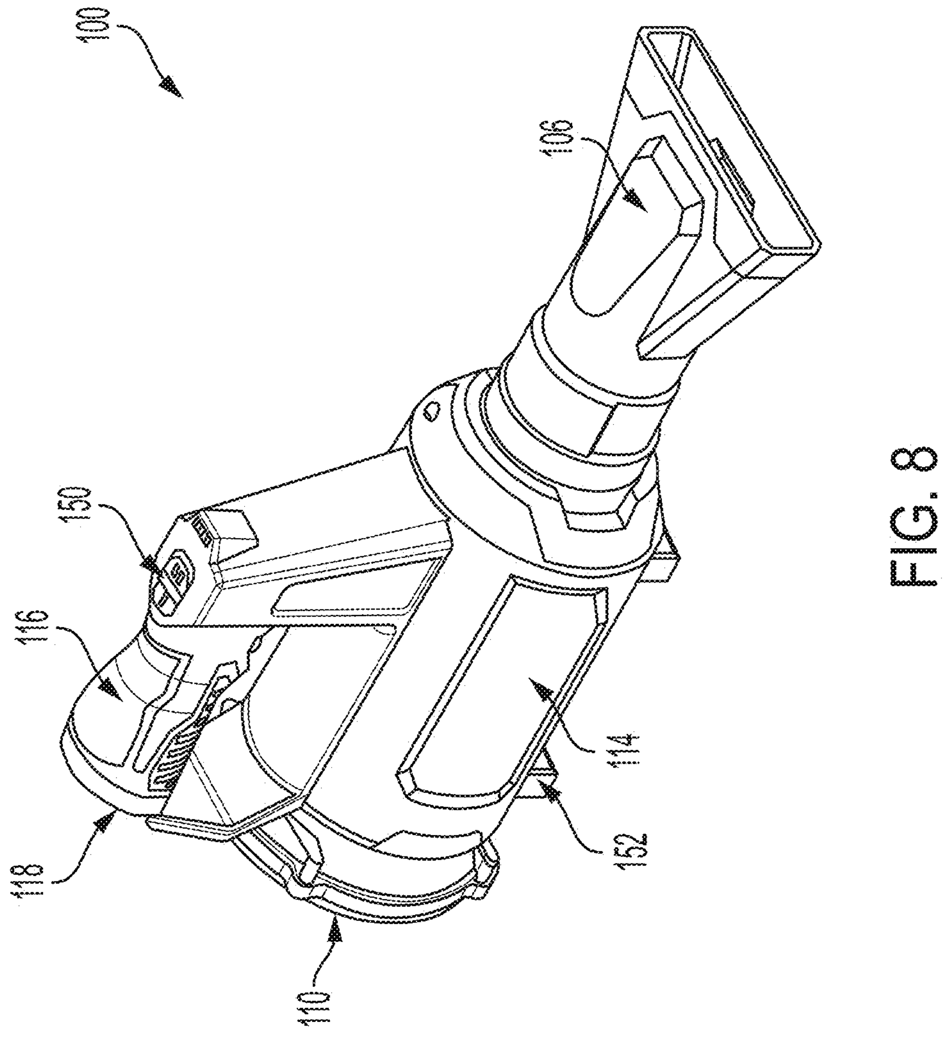
FIG. 8 is a perspective view of the handheld blower of FIG. 1 with the rectangular outlet nozzle attachment.
Figure 9:
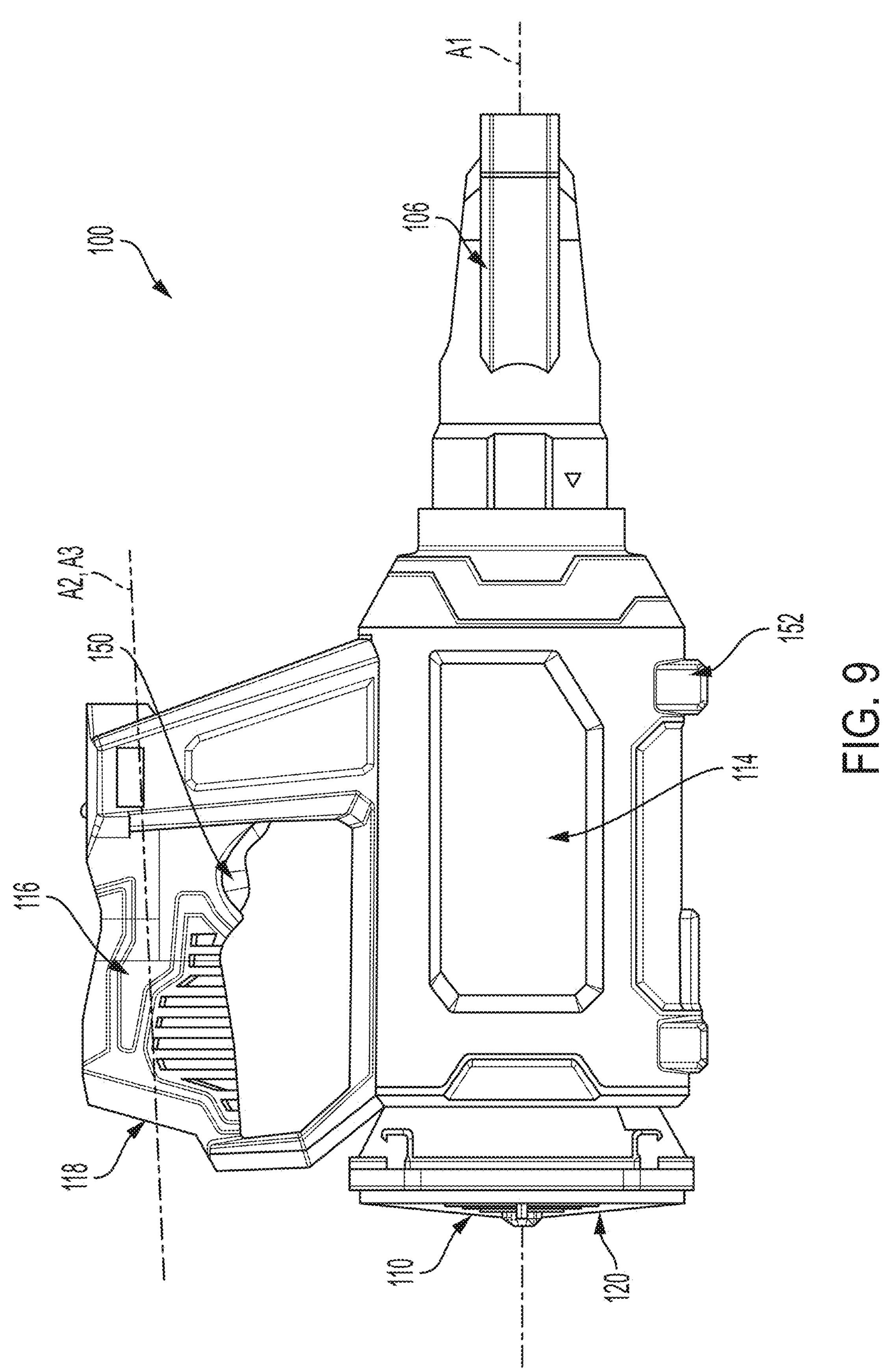
FIG. 9 is a side elevation view of the handheld blower of FIG. 1 with the rectangular outlet nozzle attachment.

As shown in FIG. 1, the handheld blower 100 is configured for use with three attachments including an extension 102 and at least two different nozzles 104, 106. Each of the extension 102, the frustoconical nozzle 104, and the rectangular outlet nozzle 106 is configured to removably connect to the outlet 108 of the handheld blower 100. The nozzles 104, 106 are also each configured to removably connect to the extension 102. The blower 100 is shown with both the extension 102 and the frustoconical nozzle 104 attached in FIGS. 2 and 3, with only the frustoconical nozzle 104 attached in FIGS. 4 and 5, with both the extension 102 and the rectangular outlet nozzle 106 attached in FIGS. 6 and 7, and with only the rectangular outlet nozzle 106 attached in FIGS. 8 and 9. It is understood that other nozzle shapes may also be used with the blower 100. Such nozzles may be attached directly to the handheld blower 100 (e.g., to the outlet 108) or indirectly via the extension 102.

Figure 10:
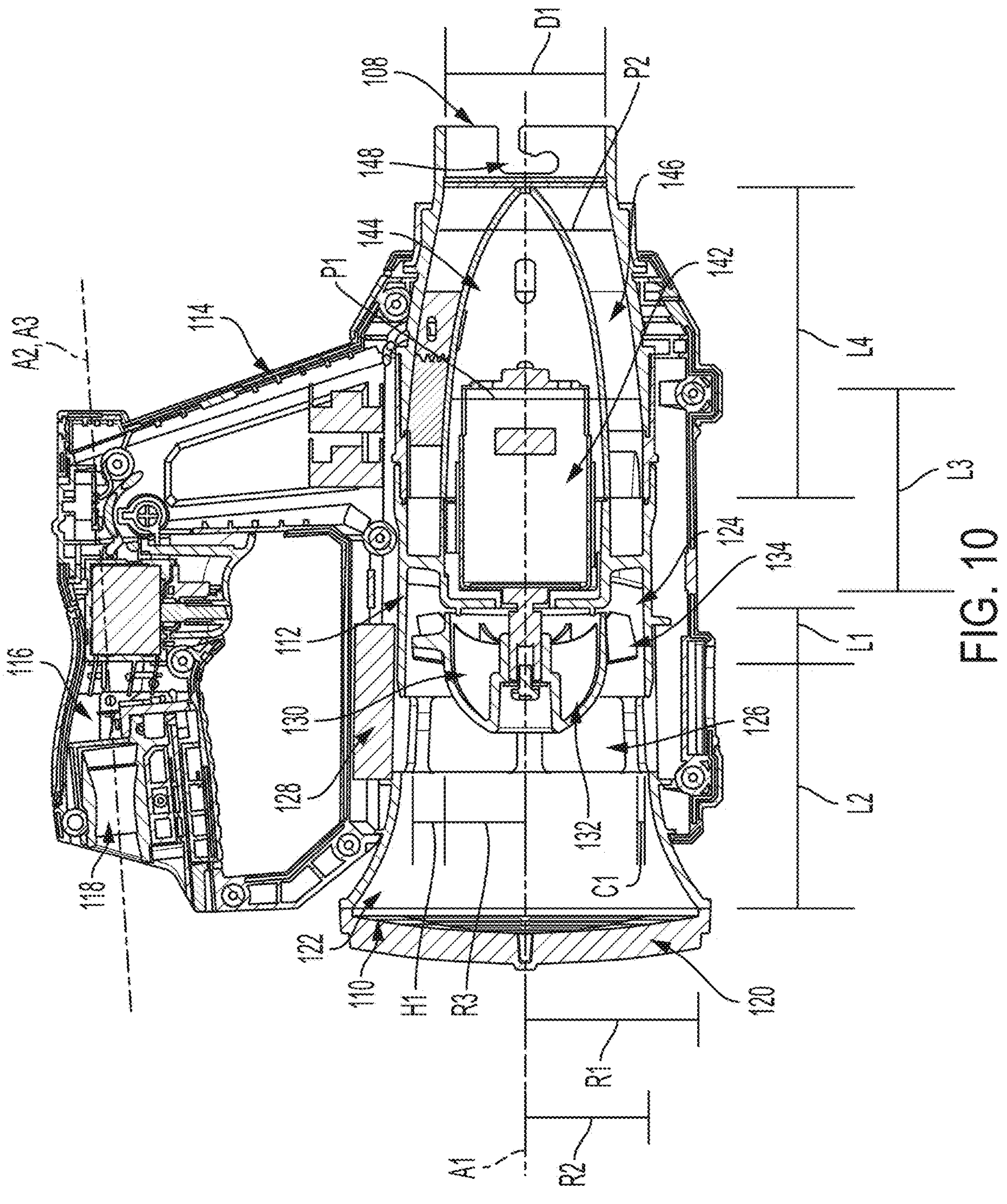
FIG. 10 is a cross-sectional side elevation view of the handheld blower of FIG. 1.

Returning to FIG. 10, the housing 114 of the handheld blower 100 further includes a handle 116 defining a handle axis A3 extending along the grip portion thereof. In the illustrated embodiment, the handle 116 extends generally parallel to and offset vertically above the axis A1 as shown in FIG. 10. In the illustrated embodiment, the grip axis A3 may be oriented substantially parallel to the axis A1 ±1 degree, ±2 degrees, ±3 degrees, ±4 degrees, ±5 degrees, ±6 degrees, ±7 degrees, ±8 degrees, ±9 degrees, ±10 degrees, ±12 degrees, ±15 degrees, or ±20 degrees.

Figure 10A:
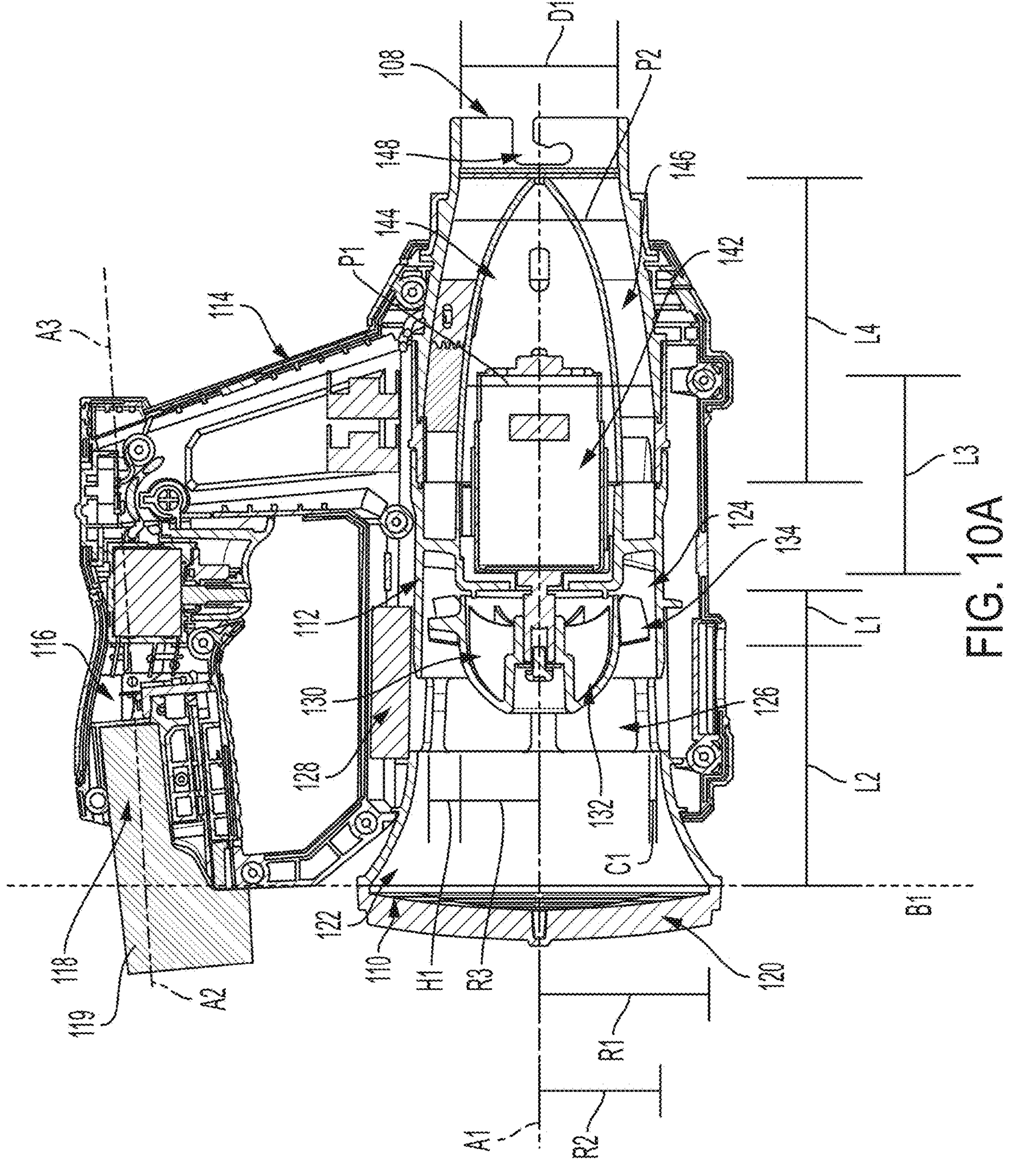
FIG. 10A is the cross-sectional side elevation view of the handheld blower of FIG. 1 with a battery pack attached thereto.

The handle 116 includes a battery receiving cavity 118 defined therein (see FIGS. 10 and 10A). In the illustrated embodiment, the battery receiving cavity 118 is configured to receive at least a portion of a battery pack 119 therein to form a detachable electrical connection to the battery pack 119. In some embodiments, the battery pack 119 is a 12-volt rechargeable battery pack. In the illustrated embodiment, the battery receiving cavity 118 defines a battery insertion axis A2 that is generally parallel to and offset vertically from the axis A1. In other embodiments, the battery pack is introduced into the battery receiving cavity 118 along the insertion axis A2 where it is releasably secured using a latch or other attachment mechanism (not shown). In the illustrated embodiment, the insertion axis A2 may be oriented substantially parallel to the axis A1 ±1 degree, ±2 degrees, ±3 degrees, ±4 degrees, ±5 degrees, ±6 degrees, ±7 degrees, ±8 degrees, ±9 degrees, ±10 degrees, ±12 degrees, ±15 degrees, or ±20 degrees.

In the illustrated embodiment, the battery insertion axis A2 is coincident with the grip axis A3. In other embodiments, the battery insertion axis A2 may pass through the handle 116 and be substantially parallel to the handle axis A3 ±1 degree, ±2 degrees, ±3 degrees, ±4 degrees, ±5 degrees, ±6 degrees, ±7 degrees, ±8 degrees, ±9 degrees, ±10 degrees, ±12 degrees, ±15 degrees, or ±20 degrees.

When installed, at least a portion of the battery pack 119 is received in the battery receiving cavity 118 while at least another portion of the battery pack 119 is disposed outside of the battery receiving cavity 118 (in a direction generally rearwardly of the handle 116 in the illustrated embodiment). The portion of the battery pack outside of the battery receiving cavity 118 is disposed radially outwardly from the axis A1 at a position that is vertically above the inlet 110 (in the orientation of FIG. 10). The battery pack 119 is also positioned so that a plane B1 oriented normal to the axis A1 and aligned with the inlet 110 will pass through the battery 119 (see FIG. 10A).

In the illustrated embodiment, a grate 120 is disposed over the inlet 110 in order to prevent larger debris from entering the inlet 110. The grate 120 may be a structure creating a series of slits, a screen, a circuitous flow path, or the like.

As shown in FIG. 10, the inlet 110 of the air duct 112 includes a bell-shaped section 122. The bell shaped section 122 includes a maximum bell radius R1 and smoothly and continuously transitions to match the smaller radius R2 of the cylindrical section 124 (described below). In some embodiments, the bell-shaped section 122 may assist in creating beneficial airflow properties through the air duct 112. In some embodiments, the maximum bell radius R1 is approximately 57.3 millimeters.

Downstream from the bell-shaped section 122 of the air duct 112 is a cylindrical section 124. The cylindrical section 124 of the air duct 112 extends along the axis A1 away from the inlet 110. The cylindrical section 124 has a cylinder radius R2 that is less than the maximum bell radius R1. In some embodiments, the ratio of the cylinder radius R2 and the maximum bell radius R1 is between 0.6 and 0.73. In other embodiments, this ratio between the cylinder radius R2 and the bell radius R1 is between 0.63 and 0.7. In still other embodiments, the ratio between the cylinder radius R2 and the bell radius R1 is 0.67. In some embodiments, the cylinder radius R2 is approximately 38.2 millimeters.

As shown in FIGS. 10 and 11, a portion of the cylindrical section 124 of the air duct 112 includes openings 126 formed into the sidewall thereof and open to the interior. The blower 100 includes one or more sound dampening elements 128 positioned such that they cover the openings 126 to minimize the sound decibel level exiting from the openings 126. In the illustrated embodiment, the sound dampening element 128 is a ring-shaped element disposed between the air duct 112 and the housing 114. More specifically, the blower 100 includes an annular piece of sound dampening material 128 encircling the air duct 112 and covering each of the openings 126. This sound dampening material layer 128 may be made of, for instance, sound dampening foam and the like.

Referring once more to FIG. 10, the fan assembly 115 of the cylindrical section 124 includes a fan 130, a motor 142 configured to rotate the fan 130 relative to the air duct 112, and a cover 144 configured to improve the aerodynamic flow of air across the fan 130 and the motor 142. While the illustrated cover 144 is shown as an aerodynamic element, it is understood that the cover 144 may also include positioning members extending radially outwardly therefrom to help co-axially locate the motor 142 and the fan 130 within the air duct 112. Furthermore, while the illustrated cover 144 is shown encompassing a portion of the motor 142, in alternative embodiments the cover 144 may serve solely as an aerodynamic device and not encompass the motor 142 therein. During operation, the motor 142 rotates the fan 130 about the axis A1 such that the fan assembly 115 draws air into the air duct 112 via the inlet 110, accelerate the air within the air duct 112, and discharges the resulting airflow through the outlet 108 in a generally forward direction F1 (see FIG. 4).

Figure 12:
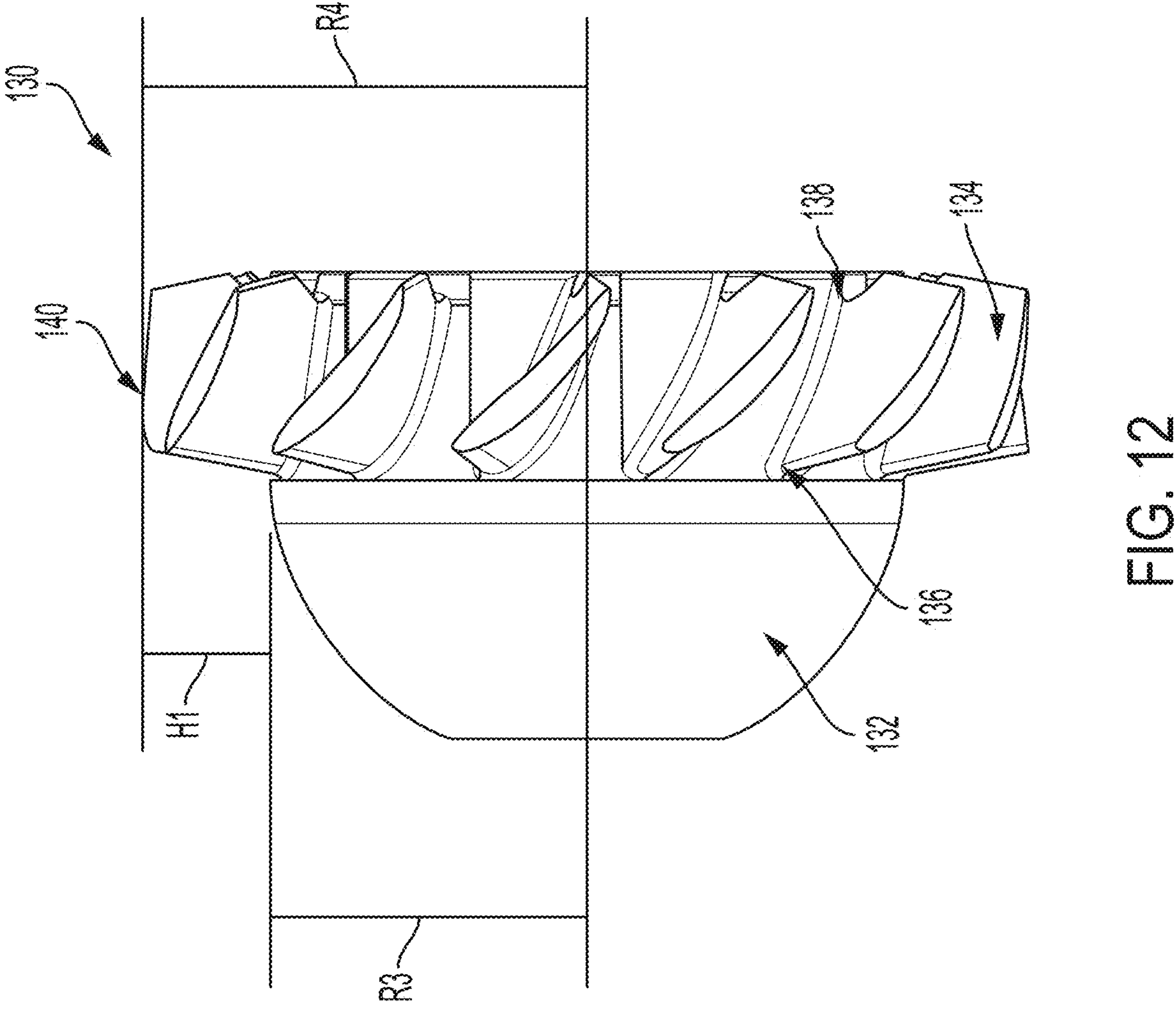
FIG. 12 is a side elevation view of a fan of the handheld blower of FIG. 1.
Figure 13:
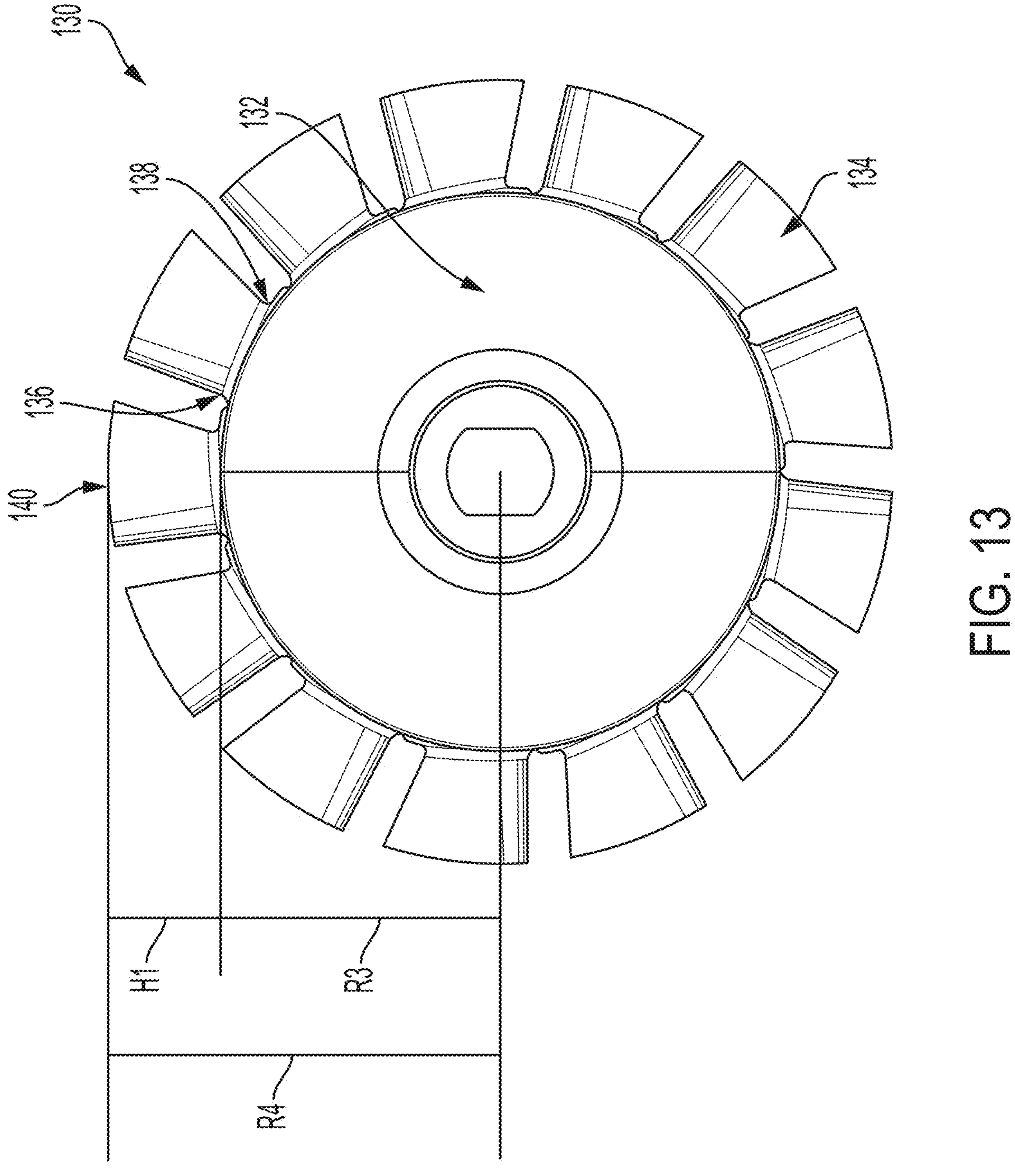
FIG. 13 is a front elevation view of the fan of FIG. 12.

The fan 130 is located in the air duct 112 between the air inlet 110 and the air outlet 108. In the illustrated embodiment, the fan 130 is disposed vertically under the handle 116 with the blower 100 oriented as shown in FIG. 10. The fan 130 is configured to rotate about the axis A1 being driven by the motor 142 (described below). As shown in FIGS. 12 and 13, the fan 130 includes a fan hub 132 and a plurality of fan blades 134. Each of the fan blades 134 extends radially outwardly from the fan hub 132. In the illustrated embodiment, the fan 130 includes thirteen fan blades 134. The fan blades 134 are spaced evenly about the circumference of the fan hub 132 and all have the same outer diameter. Each fan blade 134 is connected to the fan hub 132 from an upstream connection point 136 to a downstream connection point 138 (shown best in FIG. 12). In the illustrated embodiment, the axial length L1 of the fan blades 134 (from, for instance, the upstream connection point 136 to the downstream connection point 138 in a direction along the axis A1) may be, for instance, 15.3 millimeters. Each fan blade 134 also includes a radially outermost blade tip 140. The fan hub 132 in the illustrated embodiment includes a curvilinear surface that forms the shape of a truncated hemisphere. This shape provides a narrower cross-section of the fan hub 132 upstream of the wider portion of the fan hub 132 to allow for better aerodynamic flow across the fan hub 132 during operation.

In some embodiments, a ratio of the radius R3 of the fan hub 132 (which is measured from the axis A1 to the radially outermost end of the fan hub 132) to the radius R4 of the fan blades 134 (which is measured from the axis A1 to the blade tip 140) is between 0.6 and 0.8. In other embodiments, the ratio of radius R3 to the radius R4 is between 0.65 and 0.75. In still other embodiments, the ratio of radius R3 to the radius R4 is between 0.7 and 0.75. In still other embodiments, the ratio of the radius R3 to the radius R4 is 0.72. These may provide for a fan 130 that requires less energy to spin than conventional fans while still producing significant airflow through the air duct 112. Specifically, these ratios result in a fan 130 that is capable of spinning at faster speeds with lower torque requirements from the motor 142, therefore needing a lower current draw on an associated motor than conventional fans. In some embodiments, the fan hub radius R3 is approximately 26.3 millimeters and the blade tip radius R4 is approximately 36.5 millimeters. In such embodiments, these measurements result in a blade radial height H1 that is approximately 10.2 millimeters. This constructions leaves a clearance C1 of approximately 1.7 millimeters between the blade tip 140 and the inner surface of the cylindrical section 124 of the air duct 112.

Returning to FIG. 10, the handheld blower 100 may further include an air duct intake length L2 defined along the axis A1 from the air inlet 110 to the upstream connection point 136 of the fan blades 134. In some embodiments, this air duct intake length L2 is approximately 77 millimeters. The air duct 112 further includes an air duct radius, such as the cylinder radius R2, that extends from the axis A1 to the inner surface of the air duct 112 at a position along the axis A1 between the air inlet 110 and the upstream connection point 136. In some embodiments, the ratio of the air duct radius R2 and the air duct intake length L2 is between 0.4 and 0.55. In some embodiments, the ratio between the air duct radius R2 and the air duct intake length L2 is between 0.45 and 0.5. In other embodiments, the ratio between the air duct radius R2 and the air duct intake length L2 is 0.5. The ratio between the air duct radius R2 and the air duct intake length L2 provides a relatively short intake length L2 that still allows for sufficient airflow through the air duct 112.

As discussed above, the fan 130 is driven by a motor 142 that is disposed downstream from the fan 130 and powered by the battery pack. In some embodiments, the motor 142 includes a motor length L3 that is approximately 136 millimeters. The motor 142, in turn, is located within the air duct 112 and positioned co-axially with the axis A1. In the illustrated embodiment, the motor 142 is at least partially positioned within the cover 144 which provides an efficient aerodynamic profile to assist the flow of air through the air duct 112. In the illustrated embodiment, the housing 114 is configured to at least partially receive a portion of the motor 142 therein while providing an exterior surface that tapers as it extends downstream from the fan 130 to produce a generally conical shape. The cover 144, therefore, is disposed between the fan 130 and the air outlet 108 of the air duct 112.

The cover 144 includes a length L4 that extends along the axis A1. In some embodiments, the length L4 is approximately 102 millimeters. A flow region 146 having an annular cross-sectional area is disposed radially between the cover 144 and the inner surface of the air duct 112. In the illustrated embodiment, the annular cross-sectional area of the flow region 146 is constant along a majority of the length L4. In some embodiments, the annular cross-sectional area of the flow region 146 is constant along more than 60% of the length L4. In some embodiments, the annular cross-sectional area of the flow region 146 is constant along more than 75% of the length L4. Stated another way, the cross-sectional area of the cover 144 subtracted from the cross-sectional area of the air duct 112 results in a constant annular cross-sectional flow region 146 at a plurality of points along the axis A1 along the axial length of the cover 144. One point P1, for instance, may be located radially outwardly from a portion of the motor 142, and another point P2, for instance, may be nearer than the motor 142 to the downstream tip of the cover 144. This configuration may limit the amount of expansion and/or contraction of the airflow through the air duct 112, thereby resulting in an increased efficiency of the handheld blower 100. Further, the cover 144 and the flow region 146 may, in some embodiments, efficiently and effectively unite the airflow downstream of the cover 144.

The air outlet 108 includes an outlet diameter D1 of, for instance, 55.4 millimeters in some embodiments. The outlet 108 also includes a mounting element 148 to allow for easy and rapid connection between the air duct 112 and the various attachments 102, 104, 106 (described above). More specifically, the mounting element 148 of the illustrated device includes a twist-to-lock channel defined in the wall of the air duct 112 adjacent the outlet 108.

The illustrated handheld blower 100 may include many other features including, for instance, a plurality of controls 150 disposed on or about the handle 116, a plurality of support feet 152 to allow a user to place the handheld blower 100 on a support surface, a plurality of vibration dampening sections 154 (made of, for instance, a polymer material) connecting the air duct 112 to the housing 114 (shown in FIG. 11), a plurality of nozzle attachments 104, 106 and extension attachments 102 of various shapes, sizes, and lengths, or the like.

Figure 5:
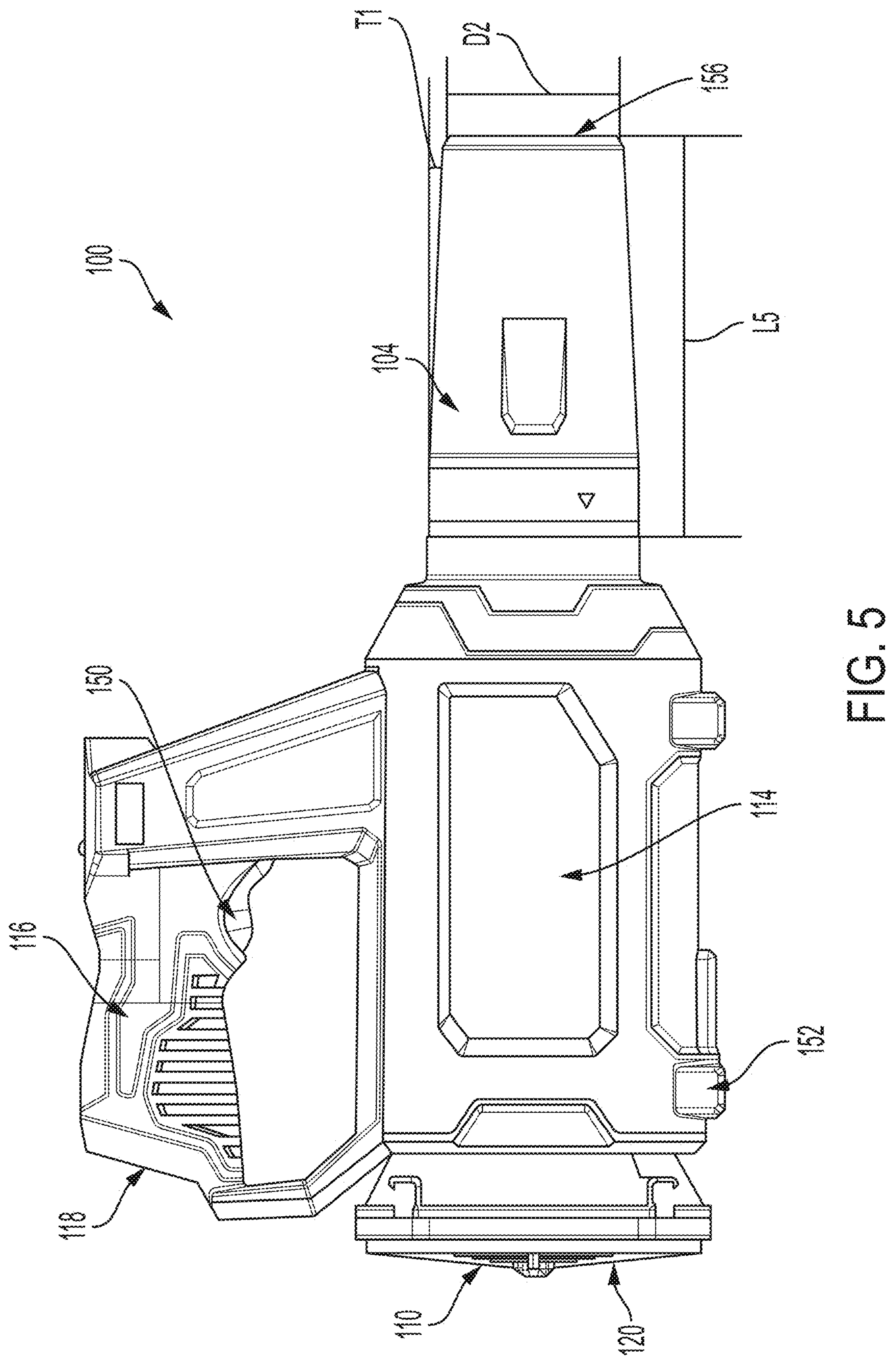
FIG. 5 is a side elevation view of the handheld blower of FIG. 1 with the frustoconical nozzle attachment.

As shown in FIG. 5, the illustrated frustoconical nozzle 104. The nozzle 104 is substantially elongated in shape having a first end 160 configured to be releasably attached to the mounting element 148 of the outlet 108 of the air duct 112, and a nozzle outlet 156 opposite the first end 160 forming a cross-sectional area that is less than the of the cylindrical section 124 of the air duct 112. In some embodiments, the diameter D2 of the nozzle outlet 156 is approximately 50 millimeters. To achieve the smaller area of the nozzle outlet 156, the nozzle 104 may be tapered at a taper angle T1 of, for instance, 1°. The frustoconical nozzle 104 may have a nozzle length L5 of, for instance, 154.7 millimeters in some embodiments.

FIG. 14 illustrates another embodiment of the air duct 1112. The air duct 1112 is substantially similar to the air duct 112 described above so only the differences will be described in detail herein. The air duct 1112 includes a light source 1050 mounted within the volume 1500 of the air duct 1112 and axially positioned between the inlet 1110 and the outlet 1108 thereof. The light source 1050 may be an LED, incandescent bulb, neon light, and the like. More specifically, the light source 1050 is mounted within the air duct 1112 on the downstream tip 1504 of the cover 1144. In the illustrated embodiment, the light source 1050 is oriented so that the resulting light beam 1508 is directed along the axis A1001 toward the outlet 1108 so that beam 1508 projects outwardly from the outlet 1108 in the same general direction as the airflow discharged from the air duct 1112 (e.g., F1). In some embodiments, the light beam 1508 includes a diverting projection defining a light beam axis A1003 where the light beam axis A1003 is co-axial with the axis A1001.

While the illustrated light source 1050 is shown being installed on the downstream tip 1504 of the cover 1144, it is understood that in alternative embodiments the light source 1050 may be mounted separately from the fan assembly 1115 within the volume 1500 of the air duct 1112 (e.g., supported by one or more separate supports). Furthermore, while the illustrated embodiment includes a single light source 1050 centered co-axially within the air duct 1112, in alternative embodiments multiple light sources 1050 may be present within the volume 1500 of the air duct 1112 and may be positioned radially offset from the axis A1001.

In some embodiments, the light source 1050 is powered by the battery pack 119. During use, the light source 1050 may be activated at any time that the motor 142 is activated. In other embodiments, the light source 1050 may be activated any time the motor 142 is activated plus an additional extended "loiter" period after the motor 142 has been deactivated. In still other embodiments, the light source 1050 may be activated and deactivated separately from the motor 142. In still other embodiments, the light source 1050 may be controlled using a combination of the above features.

FIGS. 15 and 15A illustrate another embodiment of the air duct 2112. The air duct 2112 is substantially similar to the air duct 112 described above so only the differences will be discussed in detail herein. The air duct 2112 includes one or more light sources 2050 mounted to the wall of air duct 2112 itself. More specifically, the one or more light sources 2050 are mounted to and spaced along the perimeter of the outlet 2110. In the illustrated embodiment, the air duct 2112 includes four light sources 2050 evenly spaced about the perimeter of the outlet 2110 of the air duct 2112 (e.g., every 90 degrees). However, in alternative embodiments more or fewer light sources 2050 may be present. In still other embodiments, a ring light or rope light may arcuately extend around a portion of or the entire perimeter of the outlet 2110 of the air duct 2112.

As shown in FIG. 15, each light source 2050 of the air duct 2112 that is coupled to the perimeter of the outlet 2110 is oriented so that the corresponding light beam 2500 emitted therefrom is directed in a direction parallel to the axis A2001. More specifically, each light source 2050 of the one or more light sources 2050 is configured to output a diverging beam of light along a corresponding light axis A2003. In the illustrated embodiment, each light axis A2003 is parallel to the axis A2001. However, in alternative embodiments only a subgroup of the light sources 2050 may be oriented so that the corresponding light axis A2003 is parallel to the axis A2001.

In alternative embodiments, the one or more light sources 2050 may be oriented so that light axis A2003 of the light beams 2500 extending therefrom are configured to converge on one or more focal points. In some examples, each light source 2050 may be angled so that all of the plurality of light sources 2050 are focused on a single focal point. In other embodiments, a first subset of light sources 2050 may be directed toward a first focal point while a second subset of light sources 2050 may directed toward a second focal point different than the first focal point. Still further, the one or more focal points may be positioned ahead of the outlet 2110 of the air duct 2112 (e.g., in the general direction in which air is discharged from the blower 100) and even lie on the axis A2001. In still other embodiments, the light sources 2050 may be used to illuminate the area around the user and be directed generally below the blower 100.

In some embodiments, the light sources 2050 are powered by the battery pack 119. During use, the light sources 2050 may be activated at any time that the motor 142 is activated. In other embodiments, the light sources 2050 may be activated any time the motor 142 is activated plus an additional extended "loiter" period after the motor 142 has been deactivated. In still other embodiments, the light sources 2050 may be activated and deactivated separately from the motor 142. In still other embodiments, the light sources 2050 may be controlled using a combination of the above features.

Figure 16:
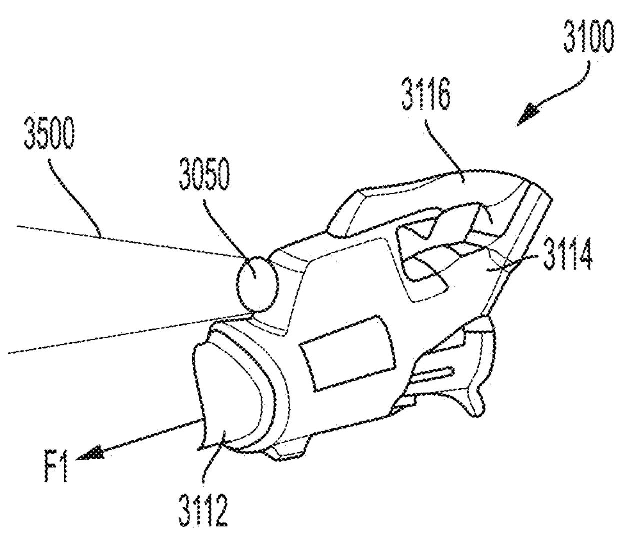
FIG. 16 is a perspective view of another embodiment of a blower.
Figure 16A:
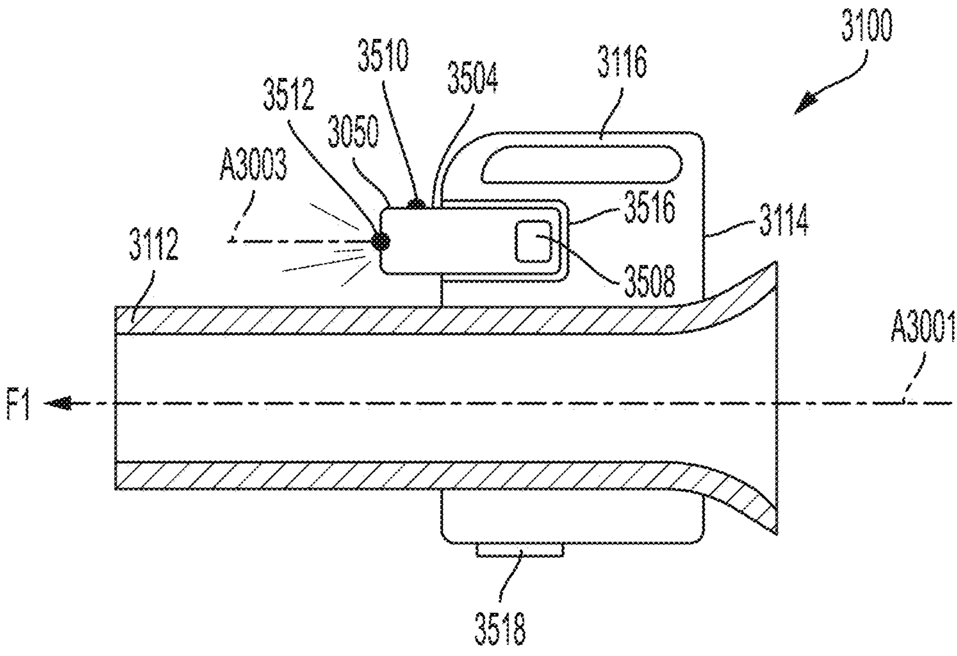
FIG. 16A is a cross-sectional elevation view of the blower of FIG. 16.

FIGS. 16 and 16A illustrate another embodiment of the handheld blower 3100. The handheld blower 3100 is substantially similar to the handheld blower 100 described above so only the differences will be discussed in detail herein. The handheld blower 3100 includes a light source 3050 releasably mounted to the housing 3114 outside the air duct 3112. More specifically, the light source 3050 is releasably mounted to the housing 3114 proximate the handle 3116 thereof positioned vertically above the air duct 3112. When the light source 3050 is mounted to the housing 3114, the light source 3050 is configured to output one or more light beams 3500 directed toward the outlet 3110 in the same general direction in which air is discharged from the blower 3100 (e.g., F1). In some embodiments, the light beam 3500 includes a diverging projection of light defining a light beam axis A3003. In some conditions, the light beam axis A3003 may be parallel with the axis A3001.

In alternative embodiments, the light source 3050 may be angled so that the one or more light beams 3500 are configured to converge on a focal point positioned forward of the outlet 3110. In some examples, the focal point may be located along the axis A3001. In still other embodiments, the light source 3050 may be adjustable such that the user is able to manually adjust and re-orient the one or more light beams 3500 during use. In still other embodiments, the light beam 3500 may be directed to serve as a flood light illuminating the area around the user and the handheld blower 3100.

In the illustrated embodiment, the light source 3050 is a separate, self-contained unit including a light source body 3504, battery 3508, user input switch 3510, and one or more light emitting elements 3512. More specifically, the housing 3114 of the handheld blower 3100 defines a mounting point 3516 to which the body 3504 of the light source 3050 may be releasably mounted during use. In the illustrated embodiment, the mounting point 3516 includes an aperture defined by the housing 3114 into which the body 3504 of the light source 3050 is inserted, but in alternative embodiments, the mounting point 3516 may include an external mount such as a rail and the like. In still other embodiments, the handheld blower 3100 may include multiple mounting locations to which the light source 3050 may be selectively attached. In such embodiments, one of the mounting locations may be positioned on the underside of the housing 3114, opposite the handle 116, so that the light source 3050 may act as a ground area flood light without the blower itself blocking the light (e.g., see element 3518 in FIG. 16A).

In some embodiments, the light source 3050 and handheld blower 3100 are configured so that when the light source 3050 is mounted to the housing 3114 the two elements are in operable communication with each other. For example, the battery 3508 of the light source 3050 may be recharged or electrically supplemented by the battery pack 119 of the handheld blower 3100. Furthermore, the inputs of the handheld blower 3100 may be used to supplement those contained on the light source 3050 so that the handheld blower 3100 may be able to remotely turn on and off the light source 3050 during use. When the light source 3050 is separate from the handheld blower 3100, the light source 3050 would act as a standard flashlight relying on its own battery 3508 and being activated and deactivated by its own user input switch 3510.

Figure 17:
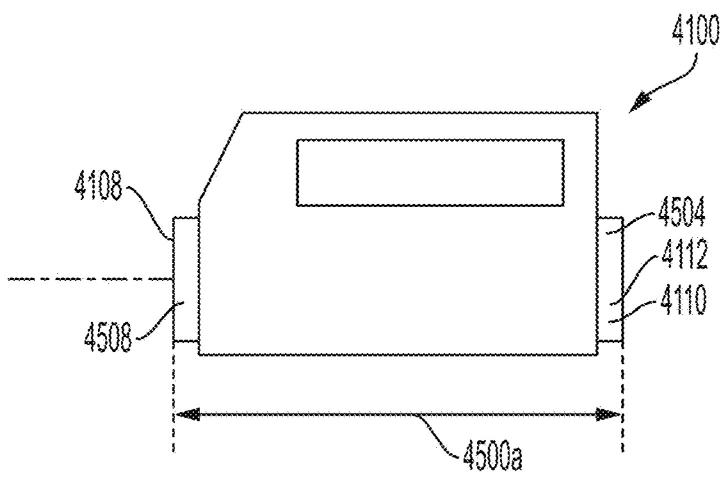
FIG. 17 is an elevation view of another embodiment of a blower having a collapsible air duct in a collapsed position.
Figure 18:
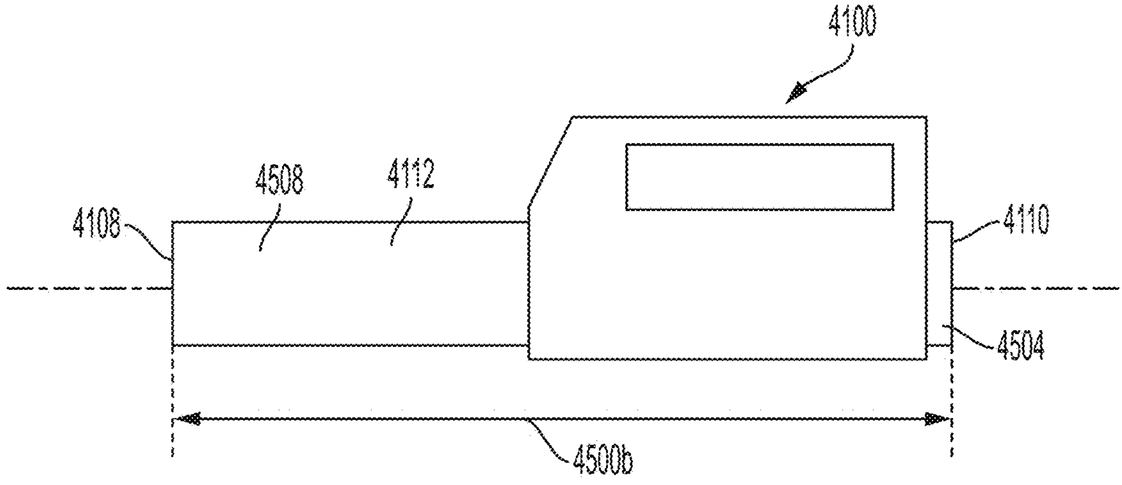
FIG. 18 is an elevation view of the blower of FIG. 17 with the air duct in an extended position.
Figure 19:
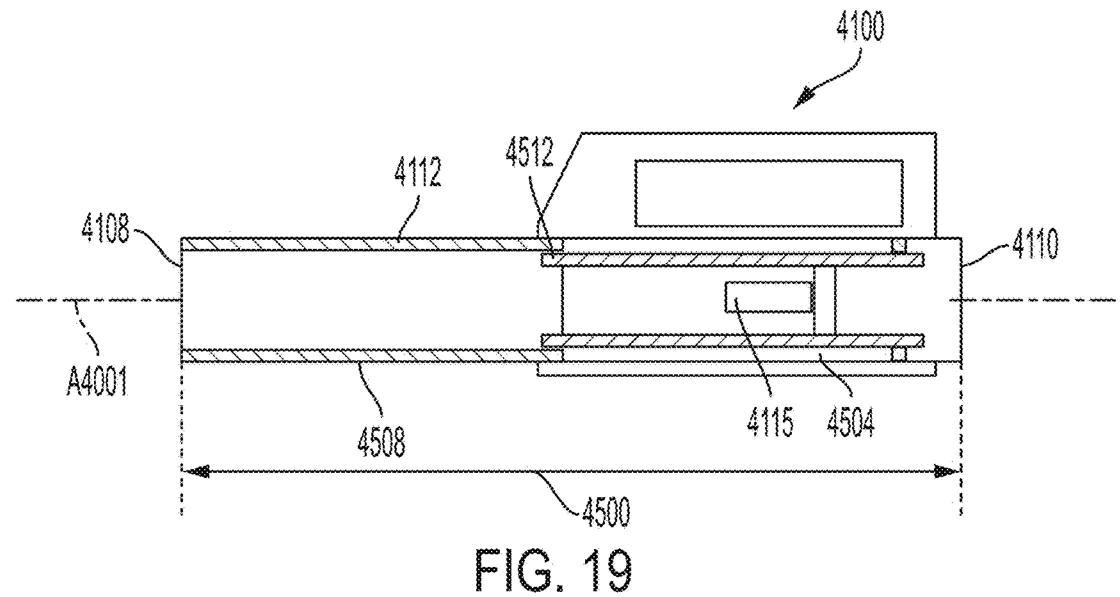
FIG. 19 is a cross-sectional elevation view of the blower of FIG. 18.

FIGS. 17-19 illustrate another embodiment of the handheld blower 4100. The handheld blower 4100 is substantially similar to the handheld blower 100 described above so only the differences will be discussed in detail herein. The handheld blower 4100 includes a collapsible or stowable air duct 4112 having an adjustable duct length 4500 generally defined as the axial length along the axis A4001 between the inlet 4110 and the outlet 4108. During use, the air duct 4112 is adjustable between a collapsed position (see FIG. 17) in which the air duct 4112 has a first duct length 4500*a*, and an extended position (see FIG. 18) in which the air duct 4112 has a second duct length 4500*b* that is greater than the first duct length 4500*a*. In other embodiments, the air duct 4112 may include multiple extended positions, each having a unique duct length 4500 greater than the first duct length 4500*a*.

The air duct 4112 includes a first or fixed portion 4504 fixedly mounted to the housing 4114, and a second or movable portion 4508 movably coupled to the first portion 4504. More specifically, the first portion 4504 and the second portion 4508 are sized such that the two portions 4504, 4508 can nest into one another when the second portion 4508 is moved axially relative to the first portion 4504. The nesting fit also permits the two portions 4504, 4508 to rotate relative to each other if needed, such as for locking and unlocking. In the illustrated embodiment, the second portion 4508 has a relatively larger cross-section than the first portion 4504 so that the first portion 4504 nests within the second portion 4508 as the duct length 4500 is reduced. However, in alternative embodiments, the first portion 4504 may be larger than the second portion 4508.

The first portion 4504 of the air duct 4112 forms the inlet 4110 while the second portion 5408 of the air duct 4112 forms the outlet 4108. As shown in FIG. 19 the layout between the two portions 5404, 4508 permits air to flow through the air duct 4112 in all positions as the interiors of both portions 4504, 4508 remain in constant fluid communication with each other.

Furthermore, while the illustrated air duct 4112 includes two nested portions, in alternative embodiments the air duct 4112 may include additional nested portions to increase the adjustability of the overall device.

In the illustrated embodiment, the second portion 4508 is captive relative to the first portion 4504 so that the two portions 4504, 4508 cannot be separated during normal operating conditions. In some embodiments, the first and second portions 4504, 4508 may include a set of interlocking grooves and tabs to retain the second portion 4508 while still allowing the two elements to move axially with respect to each other.

The air duct 4112 also includes a locking mechanism 4512 to selectively fix the second portion 4508 relative to the first portion 4504. More specifically, the locking mechanism 4512 is adjustable between a first or unlocked configuration, in which the second portion 4508 is movable relative to the first portion 4504, and a second or locked configuration, in which the second portion 4508 is axially fixed relative to the first portion 4504. In the illustrated embodiment, the locking mechanism 4512 includes a quarter-lock type system where rotating the second portion 4508 relative to the first portion 4504 (e.g., approximately 90 degrees) changes the locking mechanism 4512 between the locked and unlocked configuration. In the illustrated embodiment, the first portion 4504 may include one or more grooves formed in the outer surface thereof whereby a pin or protrusion formed in the inner diameter of the second portion 4508 may travel along the groove to at least partially restrain the relative movement of the first portion 4504 and the second portion 4508.

While the illustrated locking mechanism 4512 is a quarter-lock type system, in alternative embodiments the locking mechanism 4512 may include a spring-loaded detent mechanism, a pin moving along a tortuous path, a frictional-based system, and the like. The locking mechanism 4512 may also include some form of mechanical clamp or lock to fix the second portion 4508 relative to the first portion 4504.

As shown in FIG. 19, the fan assembly 4115 is mounted co-axially within the first portion 4504 of the air duct 4112. In turn, the first portion 4504 is mounted to the housing 4114 in a cantilever fashion using one or more mounting brackets (not shown) positioned proximate the inlet 4110. With such a layout, the air duct 4112 relies on the second portion 4504 contacting the housing 4114 for a second point of support (e.g., where the second portion 4504 passes through the housing 4114 proximate the front end of the blower 4100).

Figure 20:
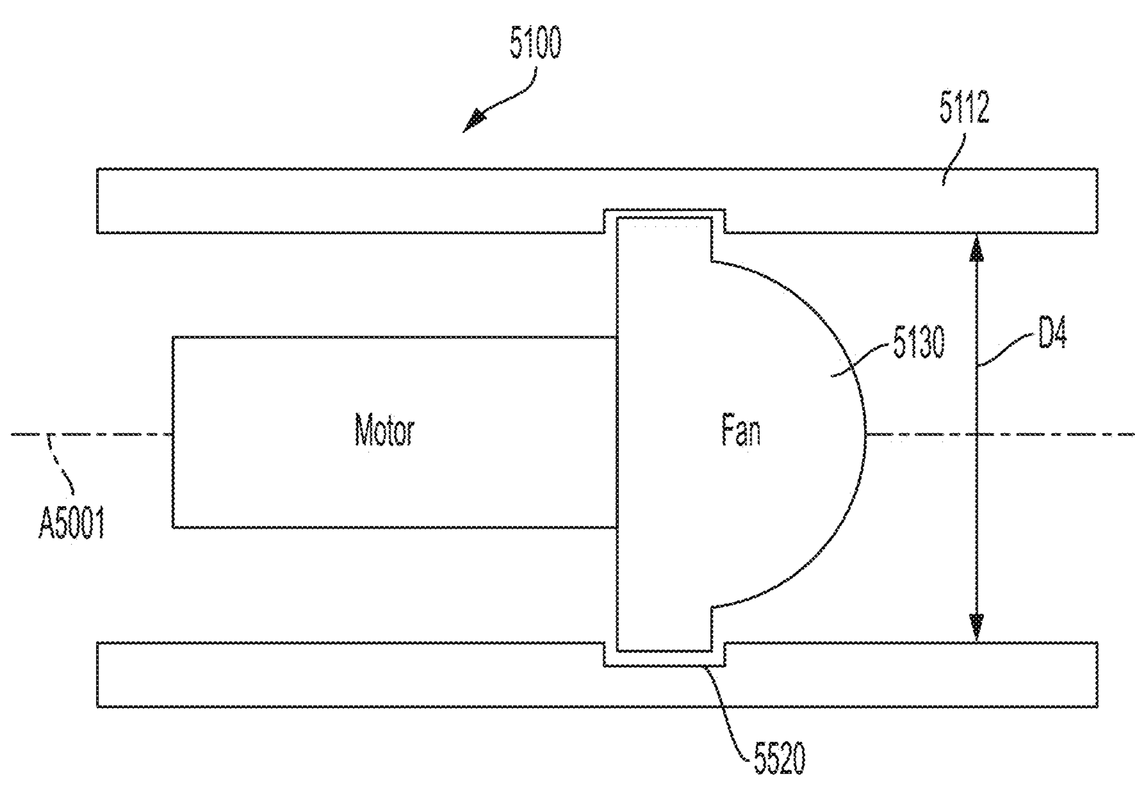
FIG. 20 is a cross-sectional elevation view of another embodiment of a blower having a ring-type fan.
Figure 20A:
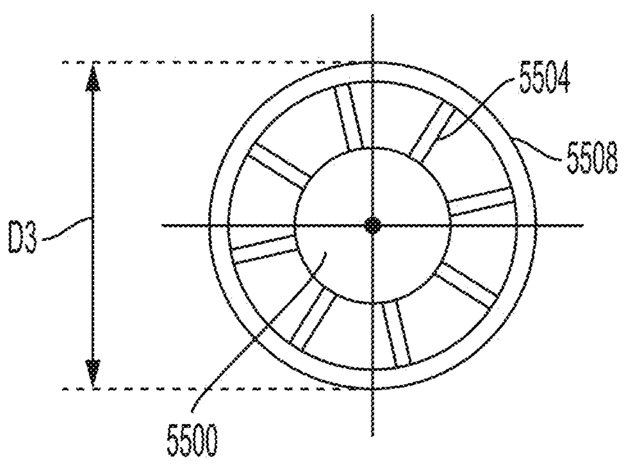
FIG. 20A is an end view of the ring-type fan of FIG. 20.

FIG. 20 illustrates another embodiment of the handheld blower 5100. The handheld blower 5100 is substantially similar to the handheld blower 100 described above so only the differences will be described herein. The fan 5130 of the handheld blower 5100 is a ring-style fan 5130 having a hub 5500, a plurality of blades 5504 extending radially outwardly from the hub 5500, and an annular ring 5508 extending circumferentially about the ends of the plurality of blades 5504 to define a fan outer diameter D3. During use, the fan 5130 is mounted to a motor 5142 for rotation about the axis A5001. In alternative embodiments, the fan 5130 may include winglets on the fan blade tips (not shown) in replacement of or to supplement the annular ring 5508. In the illustrated embodiment, the fan outer diameter D3 is greater than the inner diameter D4 of the air duct 5112.

As shown in FIG. 20, the wall 5516 of the air duct 5112 includes an annular groove 5520 extending about the entire circumference thereof and oriented normal to the axis A5001. The groove 5520 has an axial width and radial depth generally corresponding to the width and outer diameter D3 of the fan 5130. When assembled, the fan 5103 is positioned so that at least a portion of the annular ring 5508 is positioned within the annular groove 5520 generating a thin, tortuous path therebetween. As such, when the fan 5130 rotates about the axis A5001 relative to the air duct 5112, dead-head area is produced to help limit any airflow “bleeding” around the fan 3130. This, in turn, improves the efficiency of the fan 5130.

Figure 21:
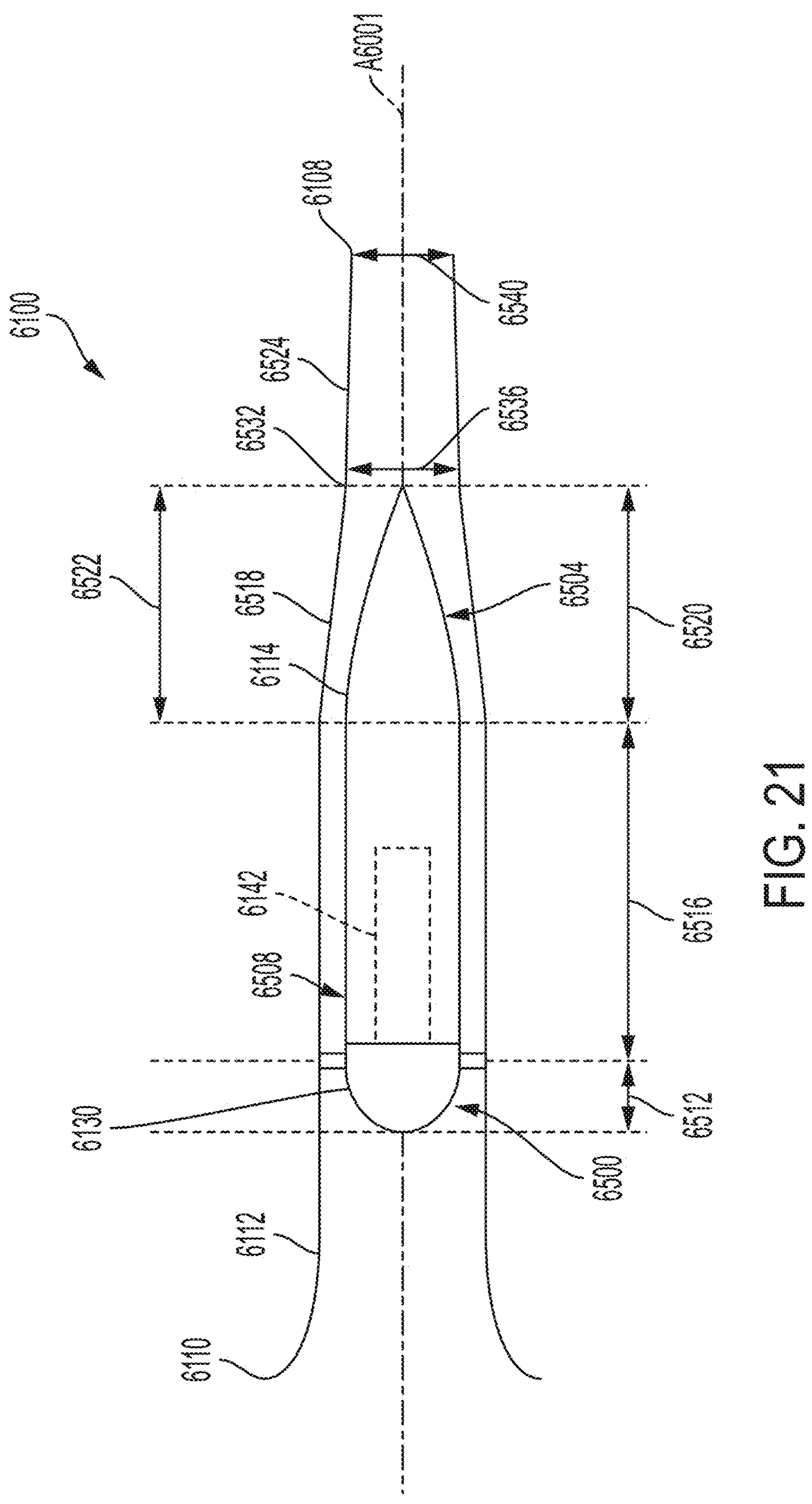
FIG. 21 is a cross-sectional elevation view of another embodiment of a blower.

FIG. 21 illustrates another embodiment of the handheld blower 6100. The handheld blower 6100 is substantially similar to the handheld blower 100 so only the differences will be discussed in detail herein. The handheld blower 6100 includes an air duct 6112 having an inlet 6110 and an outlet 6108 opposite the inlet 6110. The blower 6100 also includes a fan assembly 6115 comprising a fan 6130, a motor 6142 to drive the fan 6130, and cover 6144 at least partially encompassing the motor 6142. As shown in FIG. 21, the fan 6130, motor 6142, and cover 6144 are all positioned within the air duct 6112 between the inlet 6110 and the outlet 6108.

Together, the fan 6130, motor 6142, and cover 6144 form a structure within the air duct 6112 whose contour includes an upstream end 6500 (e.g., generally formed by the fan hub 6132), a downstream end 6504 (e.g., generally formed by the exterior surface of the cover 6144), and a cylindrical portion 6508 extending between the upstream end 6500 and the downstream end 6504 (e.g., generally formed by the remainder of the cover 6144 and a portion of the fan hub 6132). Generally speaking, the upstream end 6500 includes the tapered geometry facing upstream while the downstream end 6504 includes the tapered geometry facing downstream. The cylindrical portion 5408 generally includes the region between the upstream end 6500 and the downstream end 6504. With further reference to FIG. 21, the upstream end 6500 defines a first axial region 6512, the cylindrical portion 5408 defines a second axial region 6516, and the downstream end 6504 defines a third axial region 6520.

As shown in FIG. 21, the downstream end 6504 and the portion of the wall 6518 of the air duct 6112 axially aligned with the downstream end 6504 are sized and shaped so that the cross-sectional area defined between the downstream end 6504 and the air duct 6112 is constant along the entire third axial region 6520. In other embodiments, the cross-sectional area between the downstream end 6504 and the air duct 6112 may be constant along the entire third axial region 6520 ±1 percent, ±2 percent, or ±5 percent.

In the illustrated embodiment, the cylindrical portion 5408 and the wall 6518 of the air duct 6112 axially aligned with the cylindrical portion 5408 are sized and shaped so that the cross-sectional area produced between the cylindrical portion 5408 and the wall 6518 is constant along the entire second axial region 6516. In other embodiments, the cross-sectional area between the cylindrical portion 5408 and the air duct 6112 may be constant along the entire second axial region 6516 ±1 percent, ±2 percent, or ±5 percent.

In still other embodiments, the illustrated air duct 6112 of the blower 6100 has a constant cross-sectional area along both the second and third axial regions 6516, 6520. In still other embodiments, the air duct 6112 has a constant cross-sectional area along the entire second and third axial regions 6516, 6520 ±1 percent, ±2 percent, or ±5 percent.

In still another embodiment, the cover 6144 defines a fourth axial length 6522 generally corresponding to the portion of the cover 6144 that tapers as it extends downstream. In such an embodiment, the cross-sectional area between the wall 6518 of the air duct 6112 and the motor housing cover is constant over the entire fourth axial length 6522. In still other embodiments, the cross-sectional area between the wall 6518 and the cover 6144 is constant over the entire fourth axial length 6522.

Figure 22:
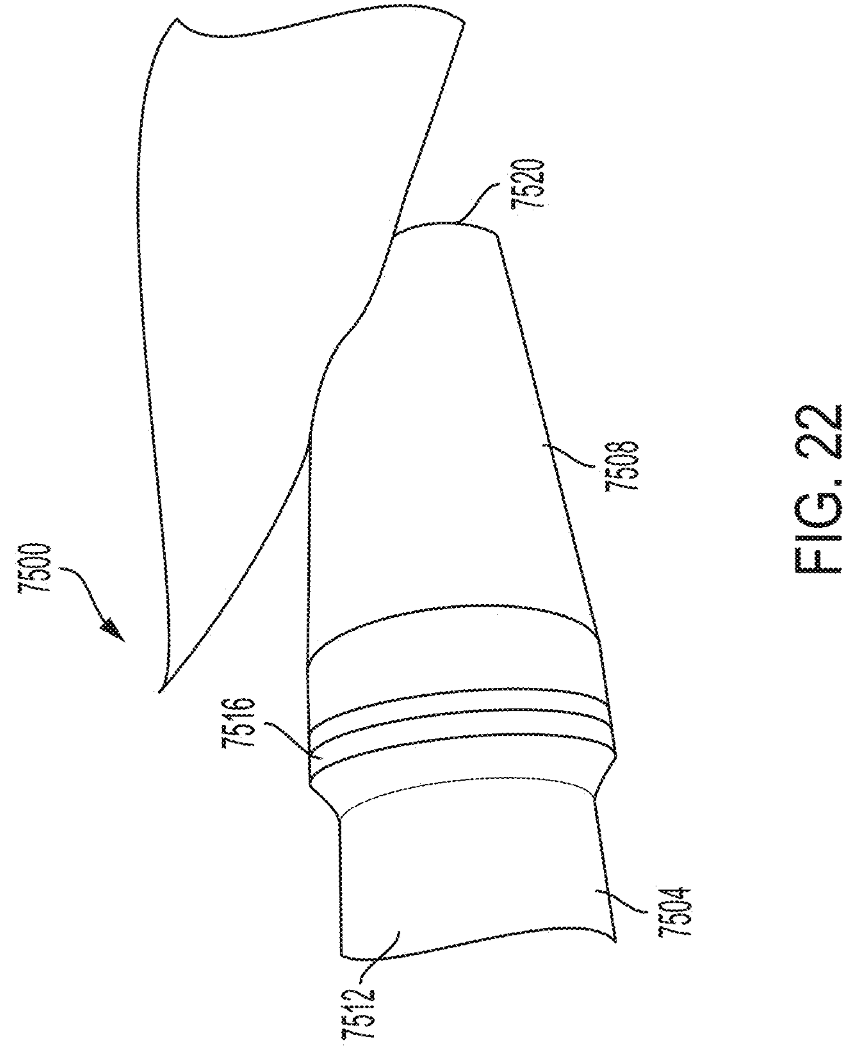
FIG. 22 illustrates a flexible nozzle for use with a blower.

As shown in FIG. 22, the air duct 6112 also includes a downstream portion 6524 extending axially downstream from the tip of the cover 6144 to the outlet 6108. The downstream portion 6524 of the air duct 6112 includes a first end 6532 proximate the tip of the cover 6144 defining a first diameter 6536, and the outlet 6108 defining a second diameter 6540. In the illustrated embodiment, the downstream portion 6524 includes a constant slope extending between the first end 6532 and the outlet 6108.

FIG. 22 illustrates an attachment or nozzle 7500 for use with the blower 100. The nozzle 7500 is substantially elongated in shape having a first portion 7504 and a second portion 7508 coupled to the first portion 7504 whereby the two portions 7504, 7508 form continuous channel along the axial length thereof. The first portion 7504 of the nozzle 7500 includes a first end 7512 configured to be releasably coupled to the outlet 108 of the blower 100 and a second end 7516 opposite the first end 7512. The second portion 7508, in turn, is coupled to and extends away from the second end 7516 of the first portion 704 to form a nozzle outlet 7520. During use, when the nozzle 7500 is attached to the blower 100, air discharged by the blower 100 through the outlet 108 enters the nozzle 7500 at the first end 7512 thereof is conveyed along the channel formed by the nozzle 7500 and is discharged through the nozzle outlet 7520.

As shown in FIG. 22, the second portion 7508 of the nozzle 7500 is formed from a pliable material (e.g., foam, rubber, silicone, etc.) so that the sidewall of the nozzle 7400 can be deformed and manipulated during use. Stated differently, the sidewall of the nozzle 7400 can be deformed to change and alter the cross-sectional shape of the nozzle 7500. This is in contrast to the first portion 7504 which is formed from substantially rigid material (e.g., plastic, metal, and the like). Such deformability may be used to manipulate the nozzle 7500 to fit into various areas such as below chairs, behind furniture, and the like.

In some embodiments, the interior surface of the second portion 7508 of the nozzle 7500 may be coated, sealed, and the like to provide a smoother surface to allow for more efficient air flow therethrough. In still other embodiments, fins, baffles, and the like may also be present in the second portion 7508 to influence the flow of air therethrough. In such embodiments, the airflow elements may also be formed from flexible material to allow them to deform together with the second portion 7508 of the nozzle itself.

Clause 1: A handheld blower comprising a housing, an air duct defining a duct axis, the air duct including an air inlet and an air outlet opposite the air inlet, wherein the air duct defines a volume between the air inlet and the air outlet, a motor at least partially positioned within the volume of the air duct, a fan operably coupled to the motor and at least partially positioned within the volume of the air duct, the fan configured to rotate about the duct axis, and a light source positioned within the volume of the air duct.

Clause 2: The handheld blower of clause 1, further comprising a housing configured to at least partially receive a portion of the motor therein, and wherein the light source is coupled to the housing.

Clause 3: The handheld blower of clause 1, wherein the light source is configured to output a light beam having a beam axis, and wherein the beam axis is parallel to the duct axis.

Clause 4: The handheld blower of clause 3, wherein the beam axis is co-axial the duct axis.

Clause 5: A handheld blower comprising a housing, an air duct defining a duct axis, the air duct including an air outlet having an outlet perimeter, a fan assembly configured to discharge a flow of air through the air outlet, and a light source coupled to the outlet perimeter of the air duct and configured to output a light beam therefrom.

Clause 6: The handheld blower of clause 5, wherein the air duct includes an inlet opposite the outlet, and wherein the fan assembly is at least partially positioned within the air duct.

Clause 7: The handheld blower of clause 5, wherein the light beam defines a beam axis, and wherein the beam axis is parallel to the duct axis.

Clause 8: The handheld blower of clause 5, wherein the light source includes a plurality of light sources, each coupled to the outlet perimeter and configured to output a corresponding light beam outwardly therefrom.

Clause 9: The handheld blower of clause 8, wherein each light beam defines a beam axis, and wherein each beam axis is parallel to the duct axis.

Clause 10: The handheld blower of clause 8, wherein each light beam defines a beam axis, and wherein each beam axis is directed toward a common focal point.

Clause 11: A handheld blower assembly comprising a housing, wherein the housing defines a battery receiving cavity configured to receive a battery pack therein, an air duct defining a duct axis, the air duct including an air inlet and an air outlet opposite the air inlet, a fan assembly at least partially positioned within the air duct, and a light source removably coupled to the housing, wherein the light source includes light source body, a light source battery, and a light emitting element.

Clause 12: The handheld blower assembly of clause 11, wherein when the light source is coupled to the housing, the light emitting element is configured to output a beam of light having a beam axis, and wherein the beam axis is generally directed toward the outlet of the air duct.

Clause 13: The handheld blower assembly of clause 12, wherein the beam axis is parallel to the duct axis.

Clause 14: The handheld blower assembly of clause 11, wherein the housing includes a plurality of mounting points, each mounting point configured to provide a location for the light source to be removably coupled to the housing.

Clause 15: The handheld blower assembly of clause 11, wherein the housing includes a handle, and wherein the light source is coupled to the housing radially opposite the handle relative to the duct axis.

Clause 16: A handheld blower comprising a housing, a first duct portion fixedly coupled to the housing, wherein the first duct portion defines an air inlet and a duct axis, and wherein the first duct portion defines a first channel, a second duct portion coupled and axially movable with respect to the first duct portion, wherein the second duct portion defines an air outlet, a fan assembly at least partially positioned within the first duct portion and configured to discharge an airflow through the air outlet of the second duct portion, and wherein the first duct portion and the second duct portion define a duct length between the air inlet and the air outlet, and wherein the duct length is adjustable.

Clause 17: The handheld blower of clause 16, wherein the second duct portion is axially movable with respect to the first duct portion between a stowed position and one or more deployed positions.

Clause 18: The handheld blower of clause 16, wherein the first duct portion is sized to be received within the second duct portion.

Clause 19: The handheld blower of clause 16, further comprising a locking mechanism adjustable between a locked configuration, in which the second duct portion is not axially movable relative to the first duct portion, and an unlocked configuration, in which the second duct portion is axially movable relative to the first duct portion.

Clause 20: A nozzle for use with a blower, the nozzle comprising an elongated body having a first end configured to be coupled to an outlet of a blower and a nozzle outlet opposite the first end, wherein the nozzle defines a channel extending between and open to both the first end and the nozzle outlet, and wherein at least a portion of the elongated body is formed from a flexible material.

Clause 21: The nozzle of clause 20, wherein at least a portion of the elongated body is formed from a rigid material.

Clause 22: The nozzle of clause 20, wherein the elongated body includes a first portion and a second portion coupled to the first portion, wherein the first portion forms the first end and wherein the second portion forms the nozzle outlet.

Clause 23: The nozzle of clause 22, wherein the first portion is formed from a rigid material and wherein the second portion is formed from a flexible material.

Although the disclosure has been described in detail with reference to certain preferred embodiments, variations and modifications exist within the scope and spirit of one or more independent aspects of the disclosure as described.

What is claimed is:

1. A handheld blower comprising:

a housing;

an air duct including an air inlet and an air outlet opposite the air inlet, wherein the air duct defines a duct axis;

a fan disposed in the air duct between the air inlet and the air outlet, the fan configured to rotate about the duct axis, the fan including fan hub and a plurality of fan blades extending radially outwardly from the fan hub, each fan blade including an upstream connection point to the fan hub; and wherein the air duct includes an air duct intake length extending axially between the air inlet and the upstream connection point, wherein the air duct includes an air duct radius between an inner surface of the air duct and the duct axis at a position between the air inlet and the upstream connection point, and wherein a ratio of the air duct radius to the air duct intake length is between 0.4 and 0.55.

2. The handheld blower of claim 1, wherein the ratio of the air duct radius to the air duct intake length is between 0.45 and 0.5.

3. The handheld blower of claim 1, wherein the ratio of the air duct radius to the air duct intake length is 0.5.

4. The handheld blower of claim 1, wherein the air duct further includes a bell shape section extending along at least a portion of the air duct intake length, and wherein the bell shape defines a maximum duct radius and a minimum duct radius, and wherein the ratio of the minimum duct radius and the air duct intake length is between 0.4 and 0.55.

5. The handheld blower of claim 4, wherein the air duct further includes a cylindrical section extending along at least a portion of the air duct intake length, and wherein at least a portion of the cylindrical section is disposed between the bell shape section and the fan.

6. The handheld blower of claim 5, wherein the bell shape section includes a maximum bell radius, the cylindrical section includes a cylinder radius, and a ratio of the cylinder radius and the maximum bell radius is between 0.6 and 0.73.

7. The handheld blower of claim 6, wherein the ratio of the cylinder radius and the maximum bell radius is between 0.63 and 0.7.

8. The handheld blower of claim 6, wherein the ratio of the cylinder radius and the maximum bell radius is 0.67.

9. The handheld blower of claim 5, wherein a portion of the cylindrical section is disposed radially outwardly from the fan.

10. The handheld blower of claim 5, wherein a portion of the cylindrical section includes openings defined therein, and a sound dampening material layer is disposed between the housing and the air duct, the sound dampening material layer covering the openings.

11. A handheld blower comprising:

a housing;

an air duct including an air inlet and an air outlet opposite the air inlet, wherein the air duct defines a duct axis;

a fan disposed in the air duct between the air inlet and the air outlet, the fan configured to rotate about the duct axis, the fan including fan hub and a plurality of fan blades extending radially outwardly from the fan hub, each fan blade including an upstream connection point to the fan hub; and wherein the air duct includes an air duct intake length extending axially between the air inlet and the upstream connection point, and wherein the air duct further includes a bell shape section extending along at least a portion of the air duct intake length, and wherein the bell shape defines a maximum duct radius and a minimum duct radius, and wherein the ratio of the minimum duct radius and the air duct intake length is between 0.4 and 0.55.

12. The handheld blower of claim 11, wherein the air duct further includes a cylindrical section extending along at least a portion of the air duct intake length, and wherein at least a portion of the cylindrical section is disposed between the bell shape section and the fan.

13. The handheld blower of claim 12, wherein a portion of the cylindrical section includes openings defined therein, and a sound dampening material layer is disposed between the housing and the air duct, the sound dampening material layer covering the openings.

* * * * *